United States Patent [19]

Curlett

[11] Patent Number: 4,836,305
[45] Date of Patent: Jun. 6, 1989

[54] DRILL PIPES AND CASINGS UTILIZING MULTI-CONDUIT TUBULARS

[75] Inventor: Harry B. Curlett, Dallas, Tex.

[73] Assignee: Pangaea Enterprises, Inc., Dallas, Tex.

[21] Appl. No.: 79,461

[22] Filed: Jul. 30, 1987

Related U.S. Application Data

[63] Continuation-in-part of Ser. No. 730,831, May 6, 1985, Pat. No. 4,683,944.

[51] Int. Cl.⁴ .................. E21B 17/02; E21B 17/18
[52] U.S. Cl. ........................... 175/215; 175/320
[58] Field of Search .............. 175/215, 320, 324; 166/242; 174/47

[56] References Cited

U.S. PATENT DOCUMENTS

| | | |
|---|---|---|
| 2,750,569 | 1/1952 | Moon . |
| 2,795,397 | 4/1953 | Hull et al. . |
| 2,798,358 | 7/1957 | Heim . |
| 2,951,680 | 9/1960 | Camp et al. . |
| 3,077,358 | 2/1963 | Costa ................................. 285/133 |
| 3,419,092 | 12/1968 | Elenburg ............................ 175/69 |
| 3,489,438 | 1/1970 | McClure ............................ 175/215 |
| 3,879,097 | 4/1975 | Oertle . |
| 3,904,840 | 9/1975 | Kosteinicek ..................... 191/12 R |
| 3,958,651 | 5/1976 | Young ................................ 175/215 |

Primary Examiner—William P. Neuder
Attorney, Agent, or Firm—Baker, Mills & Glast

[57] ABSTRACT

An improved drill pipe utilizing multi-conduit tubulars is provided. A seal subassembly (644) is constructed and arranged so as to receive a plurality of similar tubular conduits (626, 630). The similar tubular conduits (626, 630) are inserted into both ends of the seal subassembly (644). At one end, the tubular conduits (630) are threadably attached to the seal subassembly (644), while at the opposite end, the tubular conduits (626) are slidably attached to the seal subassembly (644). T-rings seals (674) are provided to insure sealing engagement of the tubular conduits to the seal subassembly (644). A collar (638) is provided to join a drill pipe (596) to one end of the seal subassembly (644). A lift subassembly (682) is provided to attach the other end of the seal subassembly (644) to another drill pipe (598). The seal subassembly (644) is constructed so as to allow the tubular conduits to be of strength sufficient to withstand pressure and compression forces only. Tension and torsional forces are handled entirely by the drill pipe outer casings (614, 616), the collar (638), the seal subassembly (644), and the lift subassembly (682).

23 Claims, 9 Drawing Sheets

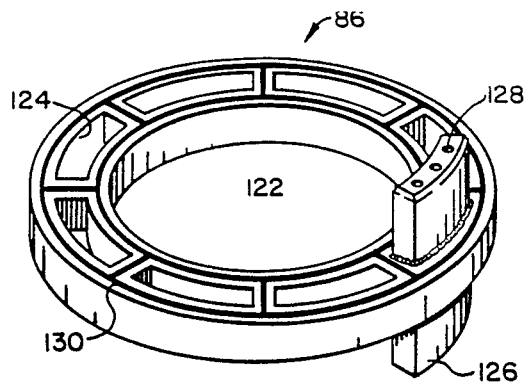
FIG. 5
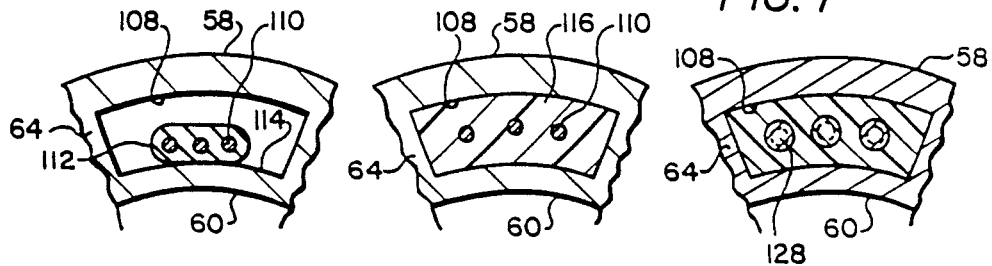
FIG. 6
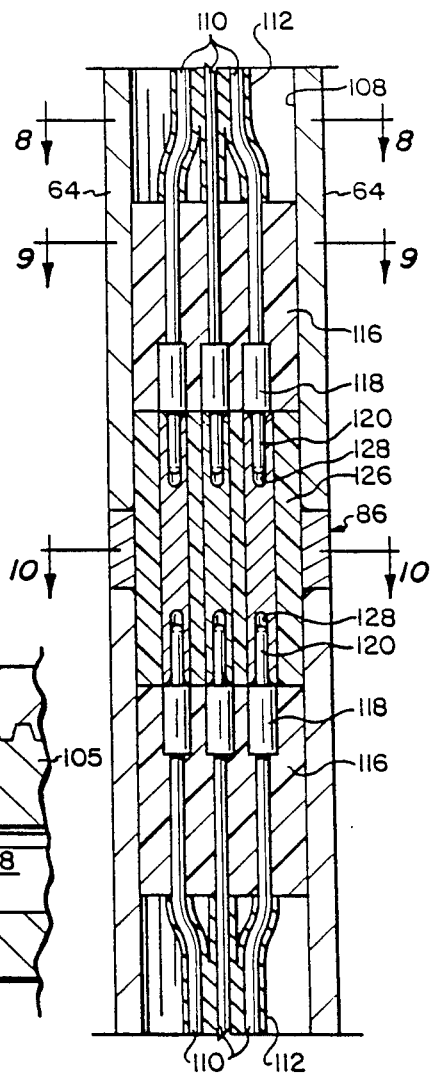
FIG. 7
FIG. 8   FIG. 9   FIG. 10

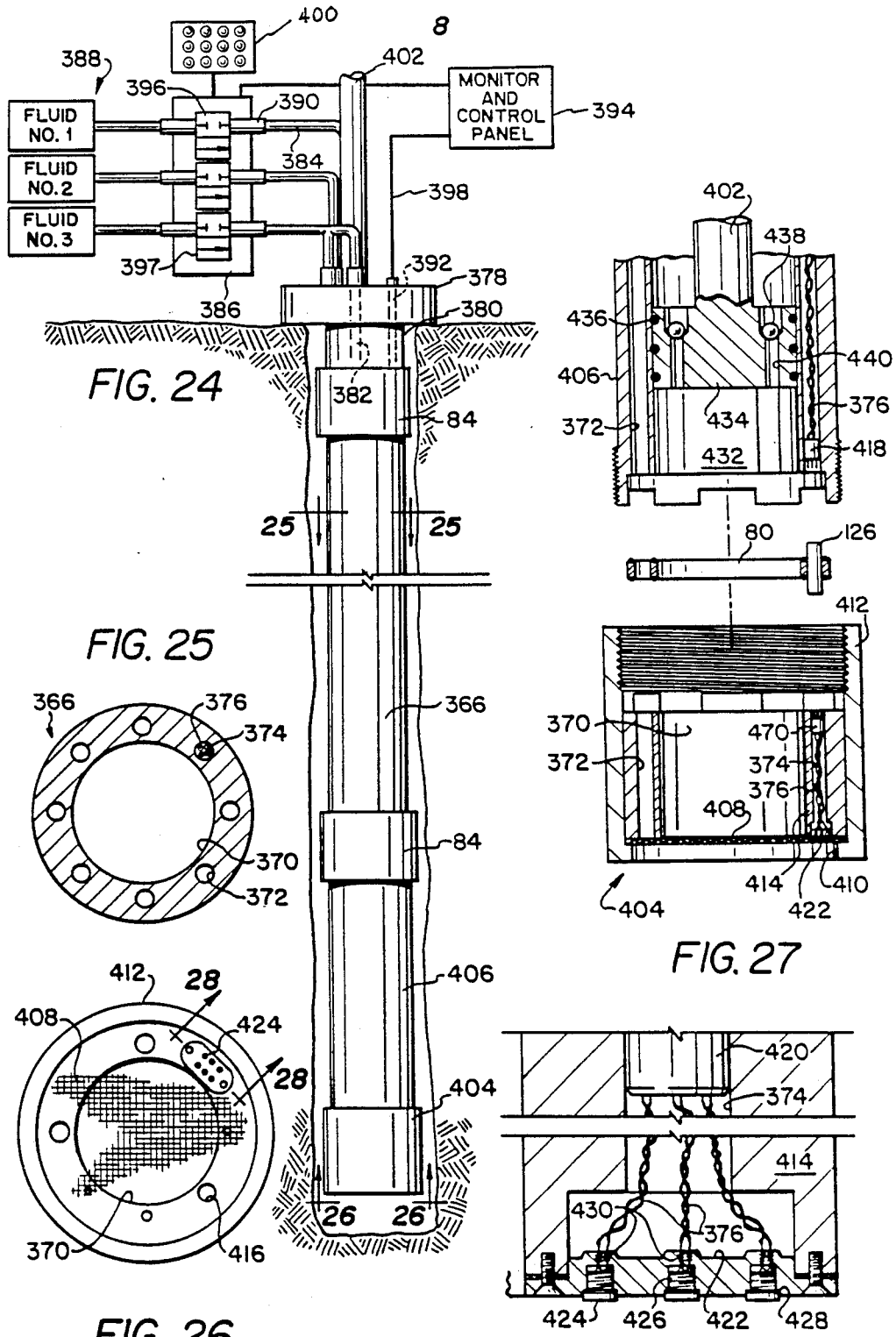

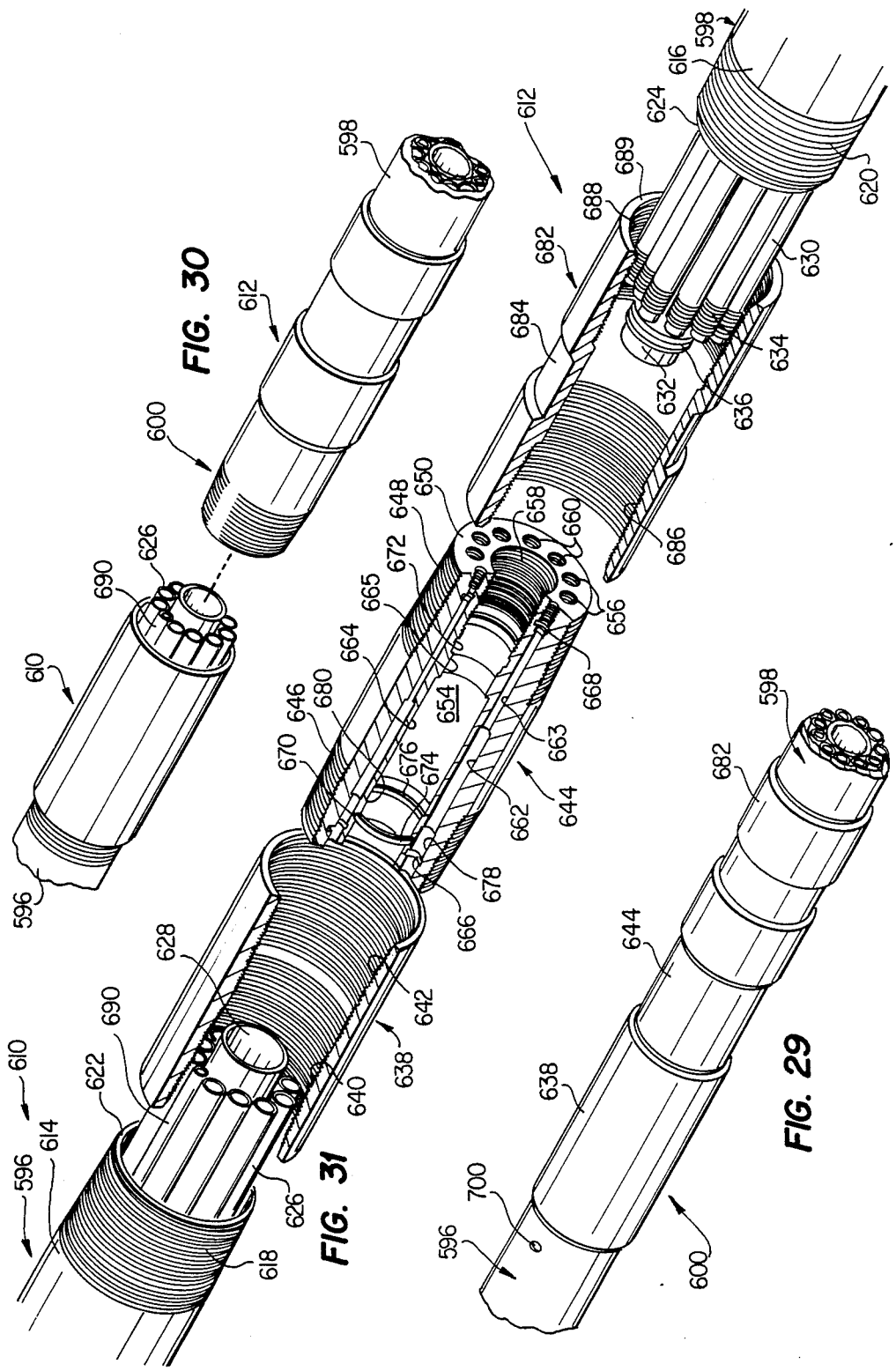

DRILL PIPES AND CASINGS UTILIZING MULTI-CONDUIT TUBULARS

RELATED APPLICATIONS

This Application is a continuation-in-part of application Ser. No. 730,831, filed May 6, 1985, due to become U.S. Pat. No. 4,683,944 issuing Aug. 4, 1987 and entitled "Drill Pipes and Casings Utilizing Multi-Conduit Tubulars."

TECHNICAL FIELD OF THE INVENTION

The present invention relates in general to well drilling operations, and more particularly, relates to methods and apparatus for boring subterranean holes, injecting high pressure and low pressure fluids into multi-conduit tubulars and monitoring downhole parameters to control drilling or production operations and thereby optimize efficiency.

BACKGROUND OF THE INVENTION

Basic well drilling operations have remained unchanged over the years insofar that a number of connected drill pipes, forming a drill string, are rotated to turn a drill bit and abrade the earth formation. During drilling, it is necessary to measure various drilling parameters such as drilling formation, inclination, temperature, PH and the like. Because the drill string rotates, and in many cases thousands of feet below the earth's surface, gaining instantaneous downhole information has been a constant problem.

For example, the most efficient drilling operation occurs when the characteristics of the formation are known to the drilling operator For different types of formations, such as rocks, soil or fluids and gases, it may be desirable to alter the surface operations to effectively deal with the type of formation in which the drill bit is presently encountering. Traditionally, the formation chips eroded by the drill bit are carried uphole in the annulus around the drill string by fluids pumped downwardly through drill pipe. The inspection of these chips, however, provides unreliable information of formation presently being drilled, as it may take a substantial period of time for the chips to ascend to the surface.

It is known in the art, i.e., U.S. Pat. No. 3,419,092, by Elenburg, that a dual passage drill pipe, in the nature of inner and outer concentric pipes, can be employed to pump aerated drilling fluid down one conduit to decrease the hydrostatic head at the drill bit and thereby accelerate the velocity by which the cuttings are moved upwardly to the surface in the other pipe conduit. In this manner, the cutting chips which represent the type of formation being drilled arrive at the surface more quickly, in which event the drilling operations can be modified accordingly. While fluid commutation to the various concentric conduits of the Elenburg-type drill pipe is relatively uncomplicated, the number of such conduits which can be employed is limited by practical considerations of the drill pipe construction.

In U.S. Pat. No. 2,951,680 by Camp et al., it is recognized that a non-concentric multi-conduit drill pipe may be employed to increase the number of conduits. However, to accommodate fluid commutation, the fluid passage transition from the conduits to the drill pipe end is convoluted into conventional concentric circular passages. As a result, commutation of different fluids into the respective conduits of the Camp et al. drill pipe was provided at the expense of complicating the manufacturability of the pipe, and thus making it costly.

Those skilled in the art have thus recognized the advantage of using multi-conduit drill pipes, but such pipes have not met with widespread success for a number of reasons. One drawback encountered in connecting such pipes together is the manner in which the conduits of one pipe are sealed to the conduits of another pipe. Conventional sealing arrangements include "O" rings or chevron seal rings (U.S. Pat. No. 2,951,680) or traditional packing (U.S. Pat. No. 3,077,358). Because of the type of seal used and the manner in which such seals have been used, the fluid pressure which the seals can withstand is generally under 7,500 p.s.i. differential.

It is apparent, therefore, that there is a need for a high-pressure multi-conduit drill pipe in which the number of conduits is not limited, nor is the structure or fabrication of the pipe unduly complicated or costly.

Moreover, there is an urgent need to monitor downhole drilling operations, instantaneously transmit the results thereof uphole, and combine the transmission medium with the drill pipe in such a manner that the drill pipe fluid carrying capability is not severely compromised.

It has been heretofore proposed to employ the central bore of the drill pipe as a chamber in which an electrical conductor is situated Exemplary of such practice is that disclosed in U.S. Pat. Nos. 2,795,397 and 3,904,840. According to this practice, however, the conductor insulation is subjected to the drill fluid, or expensive shielding must be used.

An attendant problem with the use of electrical conductors in the fluid-carrying bore is the isolation from the fluids of the electrical connections which connect lengths of conductors together. Elaborate and unusual techniques have been resorted to in order to circumvent this problem. To further compound the problem, the connection of conductors from one drill pipe to another is exacerbated in those types of pipes which require one section to be rotatably screwed into the other. In U.S. Pat. No. 2,748,358, this concern is dealt with by leaving ample cable length so that it may be twisted along with the pipe. In other instances, i.e., U.S. Pat. No. 3,879,097, the electrical cable is carried within the central bore along a majority of its length, except at the ends thereof where the cable is routed through the pipe sidewall to ring shaped contacts on the pipe ends. The number of conductors is obviously limited when resort is had to this technique.

Exemplary of prior provisions for connecting together a plurality of conductors at the pipe ends is that disclosed in U.S. Pat. No. 2,750,569. In the noted patent, the electrical cable is routed through the fluid carrying bore. This leaves the cable, as well as the connector, susceptible to the corrosive or erosive effects of the drill fluid.

Further concerns in the well drilling art which contribute to the overall expense incurred relate to the composition of the drilling "mud". The mud must be periodically adjusted with different materials and chemicals to effectively change its density, viscosity or other properties. This change can only be accomplished gradually as the mud circulates from the bit area upwardly through surface equipment. In some cases, such as an imminent well blow out, the density of the mud must be altered very quickly to prevent such an occurrence. As a consequence, many blow outs cannot be averted with known techniques. A need has thus arisen for a drill string construction which allows the prompt altering of drill mud pressure to control blow outs and to otherwise enhance drilling.

Even after the drilling operation has been completed there is a need to monitor downhole parameters during the production phase for Well management purposes. Conventional well casings have heretofore afforded a high degree of integrity to the well bore, but, are ill-equipped to provide passageways for wires, gases or liquids other than the fluid pumped upwards. As a stop-gap measure, telemetry wires have been secured to the outer periphery of the casing by metal or plastic bands and extended downhole to telemetry equipment. It is also well known to provide parasitic pipes external to the casing for carrying air pressure to create artificial lift downhole.

As a result, there is a need for a multi-conduit well casing through which the production fluid can be pumped, as well as a plurality of additional conduits for housing telemetry wires and carrying solvents, antifreeze solutions and a host of other fluids.

SUMMARY OF THE INVENTION

In accordance with the present invention, methods and apparatus are provided for commutating a number of high and low pressure fluids through unique drill pipes having uniform conduits therethrough, and for transmitting electrical signals or power downhole to sensors to gather information relating to the subterranean formation.

In accordance with the invention, a multi-conduit drill pipe is provided with a uniform cross-sectional configuration throughout the pipe, thereby lending the construction thereof to extrusion methods. Cross-sectionally, the drill pipe includes an outer cylindrical wall, an inner cylindrical wall defining a central bore, and a plurality of other conduits between the inner and outer walls. In the preferred form of the invention, the drill pipe has an outer casing connected by coupler means to other similar outer casings of the drill string to transmit torque and to provide the tensile strength for suspending a drill string many feet into the earth. Supported within the outer casing is a cluster of inner tubulars, including plural radial tubulars disposed around a larger central tubular. The inner tubulars do not carry tension or torsional loads, but rather sustain the compression or burst pressures of fluids carried within the tubulars. Each inner tubular is supported at its ends by a seal subassembly which is fixed to the outer casing. A telescopic sealing arrangement is provided between one end of each inner tubular and the coupler to allow the outer casings to extend somewhat under tension loads, without also causing extension of the inner tubulars. The other end of the inner tubulars are threaded into a coupler secured to the other end of the outer casing.

One conduit includes electrical wires therein and a connector fixed in the conduit at each pipe end. Because it may be desirable to utilize various conduits for different fluids, or electrical circuits, the pipes each include on opposite ends an index lug and an index recess so that the particular conduits of each pipe, when joined, are maintained aligned. In addition to the index lugs and recesses, the pipe ends also include different lugs and recesses for driving one pipe with the other.

According to the invention, a seal with passages is provided, which seal has a cross-sectional shape similar to that of the drill pipe, and wherein one such passage includes an intermediate electrical connector for joining the circuits of each pipe together An elastomer on each side of the seal assures a high pressure integrity between each conduit when the pipes are joined.

In accordance with a further aspect of the invention, the drill pipes are joined together with the seal therebetween by a threaded coupling collar with uniform diameter internal threads at one end thereof and uniform diameter internal threads at the other end thereof but each such coupling collar end having a different diameter and thread pitch. Each end of a drill pipe section includes threads with diameters and pitches corresponding to that of the coupling collar. This aspect enables the drill pipes to be coupled together by a differential thread action which compressively squeezes the seal in sealing engagement between the adjacent pipes.

In accordance with a further feature of the invention, a plurality of fluids from respective sources are commutated to various drill pipe conduits by a fluid commutator having a shaft rotating in a manifold to which the different fluid sources are connected. The cylindrical shaft has internal passages which individually correspond to the respective drill pipe conduits. Each commutator shaft passage also opens into an inlet port on the cylindrical side of the shaft. In fluid communication around the various inlet ports, which are axially spaced along the commutator shaft, are corresponding annular grooves in the manifold. Each commutator shaft passage is thus connected through its manifold groove to a fluid source. With this arrangement, various drill pipe conduits are in continuous communication with a selected fluid source.

With regard to a related feature of the invention, the fluid commutator shaft is coupled to the drill pipe string through an adaptor which connects each commutator shaft passage, and thus a fluid source, to selected ones of the drill pipe conduits. Thus, a number of adaptors may be kept on hand and interchanged with others to connect the various fluid sources through the commutator shaft to desired ones of conduits in the drill pipe string.

With regard to a still further, aspect of the invention, a quill section of the gooseneck swivel includes a quill shaft which further includes an electrical connector terminating the drill pipe electrical wires. A number of slip rings corresponding to the number of wires carried in the drill pipe are placed around the quill shaft, each such slip ring being connected to one of the wires in the drill pipe. Stationary brush means contact the slip rings and communicate the downhole electrical responses to surface monitor equipment.

From the foregoing, an improved method of drilling is made possible, in which high pressure fluids can be independently injected into one or more drill pipe conduits to, for example, simultaneously erode the formation, clean and cool the drill bit or the drill bit path, while other lower pressure fluids in other conduits are combined downhole with gases in yet other conduits to decrease the downhole hydrostatic pressure. Simultaneously, drill bit or pipe sensors may communicate to surface monitor equipment information regarding temperature, pressure, inclination, etc which information may be immediately used to alter the drilling operation.

Such information may further be used, for example, to control the application of annulus pressure to liquid or mud and avert a well blow out. In addition, and according to the invention, should a potential well blow out be detected, a pump may be activated to apply pressure to counteract the excessive upward flow in the central passage of the drill pipe. Moreover, a feature of the invention includes an annular accumulator which can adjust the pressure exerted on the liquid in the wellbore annulus, and thereby maintain a given pressure on the annulus liquid. The ability to apply pressure to the liquid in the annulus of the well has the effect of increasing the density of the mud at the bottom of the well without having to recirculate the mud and add materials to weight it up.

A parallel feature of the invention which is of paramount importance is the provision of a multi-conduit well casing having many attributes of the drill pipe, including a generally larger central bore to accommodate a large volume of production fluid. Well production management is enhanced by the ability to monitor many downhole parameters and simultaneously inject fluids and solutions downhole at various pressures to optimize the production of the well.

BRIEF DESCRIPTION OF THE DRAWINGS

For a more detailed description of the construction and operation of the present invention, reference is now made to the following description taken in conjunction with the accompanying drawings, in which:

FIG. 3d is a cross-sectional view of still another embodiment of the multi-conduit tubular illustrating a nest of individual conduits occupying one conduit of the drill pipe of FIG. 3a;

FIG. 5 is an isometric view of the tubular seal, and an intermediate electrical connector fixed therein;

FIG. 6 is a cross-sectional view at the juncture of joined tubulars, illustrating the seal and the intermediate electrical connector;

FIG. 7 is a cross-sectional view of joined tubular conduits carrying the electrical conductors, connectors and contacts;

FIGS. 8-10 are cross-sectional views taken along respective lines 8—8, 9—9 and 10—10 of FIG. 7;

FIG. 24 is a simplified illustration of a multi-conduit tubular employed as a well casing;

FIG. 25 is a cross-sectional view of the multi-conduit well casing taken along line 25—25 of FIG. 24;

FIG. 26 is an end view of the bottom of a well casing stub taken along line 26—26 of FIG. 24;

FIG. 27 is a cross-sectional side view of the well casing stub removed from the multi-conduit pump section;

FIG. 28 is a partial cross-sectional view of the terminal end of the well casing stub, taken through the sensor chamber;

FIG. 29 is a fully assembled perspective of an improved drill pipe coupling arrangement;

FIG. 30 is a partially assembled perspective of the coupling arrangement of FIG. 29; and FIG. 31 is an exploded partial cross-sectional view of the improved coupling arrangement of FIG. 29.

DETAILED DESCRIPTION OF THE INVENTION

General Overview

Figure 1:
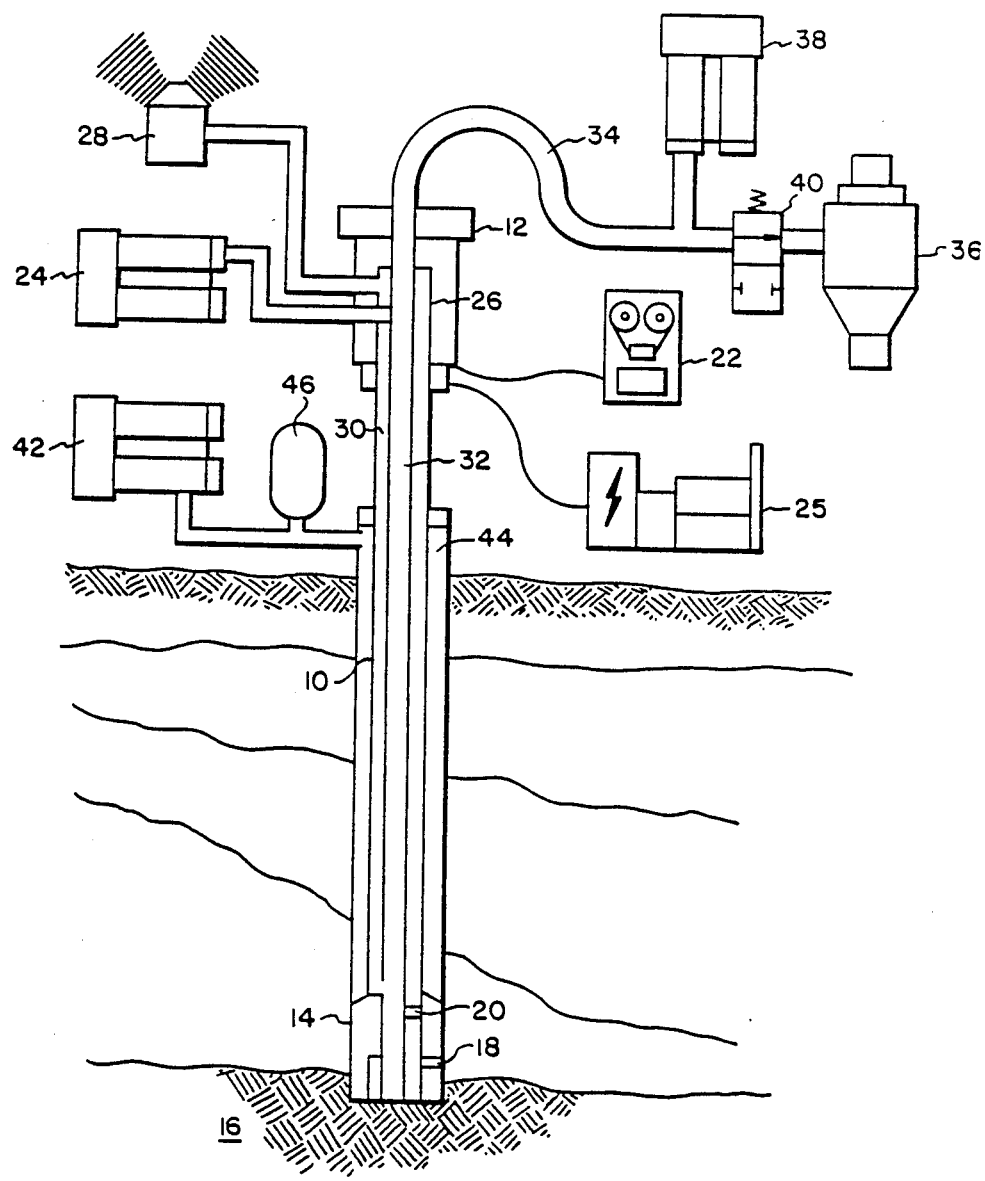
FIG. 1 illustrates in a general manner the uphole and downhole equipment employed to carry out the various aspects and features of the invention.

Referring now to the figures, there is shown in FIG. 1 the general aspects of the methods and apparatus according to the invention. As shown, the invention includes the multi-conduit drill pipe generally designated by the reference character 10 and is driven by the multi-fluid gooseneck swivel 12. Drill bit 14 may be of the many varieties available for eroding the subterranean formation 16 to bore a well.

Various downhole sensors, such as temperature sensor 18 or pH sensor 20 may be employed within the drill bit 14 to gather downhole data and transmit the same to surface monitor equipment 22 through drill pipe wires (not shown in FIG. 1). An electrical power source 25 may also be provided to supply power to drill bit sensors and control of downhole electrical tools, as needed.

A liquid pump 24 supplies high or low pressure fluid to a fluid commutator 26 in the gooseneck swivel. Other similar pumps may also be utilized so various fluids at the same or different pressures can be pumped downhole to provide improved drilling techniques not heretofore achieved. In a similar manner, a compressor 28 supplies a gas, such as nitrogen, to the fluid commutator 26 for distribution therein to desired conduits 30 of the drill pipe. When the central conduit 32 of the drill pipe is utilized as the channel through which the formation chips are carried in liquid or, gas upwardly, such chips are carried by the gooseneck hose 34 to a cyclone separator 36 which is effective to separate the chips from the returned drilling fluid. Liquid pump 38 is also connected to the gooseneck hose 34 to dump fluid from a source (not shown) downwardly through the central conduit 32 to drill or alternatively to counteract any undesired fluid flow in such conduit due to a blow out in the well. Pump 38 may alternatively be used to pump cement or another sealing material downhole to seal the well A valve 40 is automatically closed when pump 38 is activated so that the pumped material does not enter the separator 36.

Depending upon the method of drilling desired, kill line pump 42 is provided to pump drill fluid down the annulus 44 of the well. An annular accumulator 46 maintains a desired pressure on the annular fluid in the well.

From the foregoing, it is evident that the invention provides various options and alternatives to use in optimizing the drilling operation based upon the existing conditions From the discussion which follows, it will become even more evident that the present invention provides an advance in the well drilling art not heretofore recognized.

Multi-Conduit Drill Pipe

Figure 2:
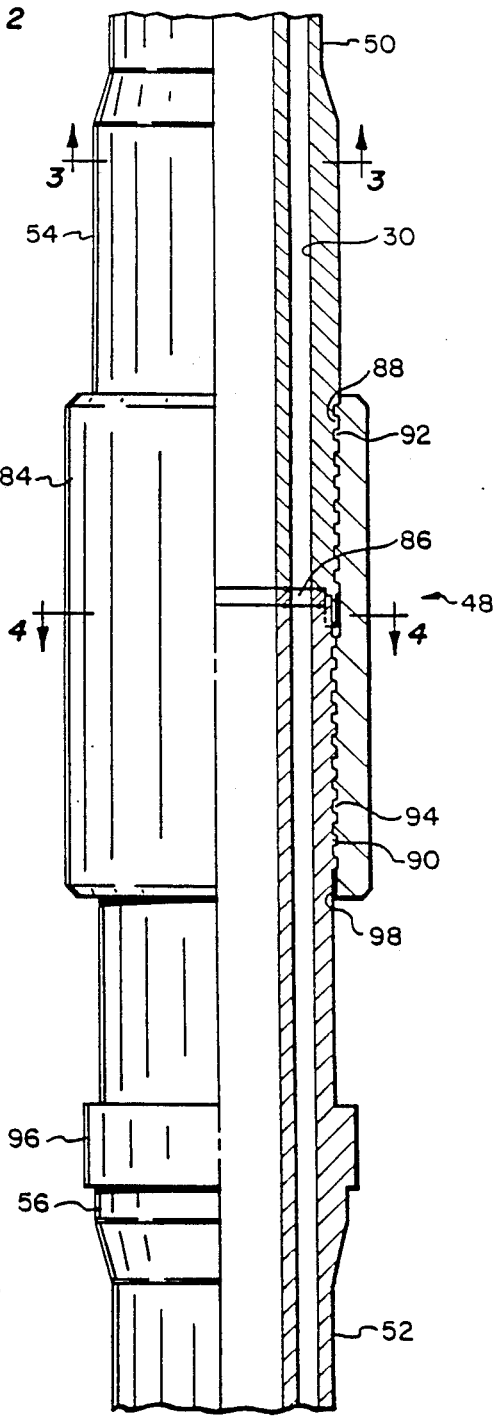
FIG. 2 is a side elevational view of a portion of two drill pipes coupled together, and partially cross-sectioned to illustrate thread engagement between the pipes and the coupling collar.

With reference now to FIG. 2 there is shown a coupled tubular section, and particularly a drill pipe, forming a part of the drill string, and more specifically the means by which end sections of the drill pipe are joined. Shown in FIG. 2 is the aspect of the drill pipe wherein a plurality of conduits, one shown as reference character 30, are uniform throughout the drill pipe and thus uniform across the tool joint 48 from one pipe 50 to another pipe 52 joined thereto Each such conduit 30 is rectilinear in nature, despite the fact that the upset sections 54 and 56 of the drill pipes shown in FIG. 2 are somewhat larger in diameter to satisfy strength and sealing considerations.

Figure 3A:
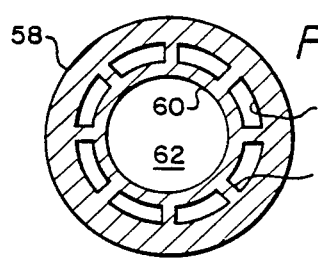
FIG. 3a is a cross-sectional view of the multi-conduit tubular, taken along line 3—3 of FIG. 2.

The drill pipe 50 is more clearly shown by the cross-sectional view of the multi-conduit tubular of FIG. 3a. It is of great practical importance from the standpoint of versatility to provide many conduits in the drill pipe, all of which are rectilinear throughout the pipe and which can be interjoined to supply any desired number of liquids or gases downhole, the liquids or gases being isolated from one another and therefore capable of being supplied at different pressures and quantities. To that end, the invention in its preferred form is comprised of a drill pipe having an outer sidewall 58 and an inner concentric sidewall 60 forming a central conduit 62 through which, by choice and not by necessity, a majority of fluid is pumped. Located between the inner sidewall 60 and outer sidewall 58, the various longitudinal conduits 30 are defined in the nature of a longitudinal annular channel between the inner and outer sidewalls, divided into the independent conduits 30 by radial dividers 64. Each conduit 30 thus has the general cross-sectional configuration of a trapezoid with the arcuate sides defining the parallel sides.

Figure 3B:
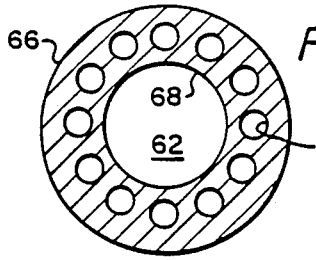
FIG. 3b illustrates a cross-sectional view of an alternative embodiment of a multi-conduit tubular illustrating circular, peripheral conduits peripherally located about the central conduit.

With this construction, it is highly advantageous to fabricate drill pipes or well casings by extrusion methods out of aluminum with steel upsets, or entirely of high grade steel. Conduit configurations other than that shown in FIG. 3a may, of course, be used to satisfy particular needs. For example, FIG. 3b illustrates an alternative form of the multi-conduit tubular with an outer and inner sidewall 66 and 68, the inner sidewall 68 again defining a central conduit 62. In this form, however, a series of cross-sectionally circular conduits 70 are spaced equal distances peripherally about the central conduit 62 between the inner 68 and outer 66 sidewalls. This form of the tubular may advantageously be constructed by standing the pipe stock on end and drilling each conduit vertically.

Figure 3C:
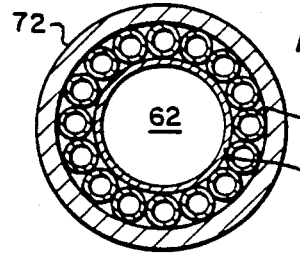
FIG. 3c is a cross-sectional view of yet another embodiment of a tubular illustrating an outer pipe, an inner pipe forming a, central conduit, and a plurality of other pipes forming peripherally about the inner central pipe.

FIG. 3c shows yet another version of the multi-conduit tubular similar to FIG. 3b, except constructed of a large pipe 72, the exterior wall thereof forming the outer sidewall, and a smaller pipe 74 forming the central conduit 62. Between the larger and smaller pipes, 72 and 74, a plurality of other even smaller diameter pipes 76 are peripherally located Each pipe of the FIG. 3c is welded to an adjacent pipe at the pipe ends.

Figure 3D:
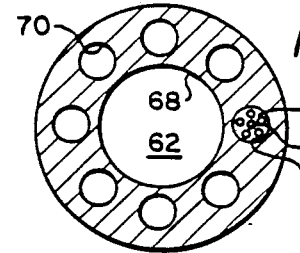

FIG. 3d depicts a modified version of the tubular of FIG. 3b. In the tubular having perpheral circular conduits 70, there is inserted a cylindrical multichannel insert 78, and fixed therein such as by welding. The insert 78 includes a central axial channel 80 with a number of peripheral channels 82, all of which effectively increase the number of conduits in the tubular, albeit with decreased diameters.

It is seen, therefore, that an easily manufactured tubular has been provided, with a plurality of independent conduits extending uniformly throughout the length thereof It will be discussed at length below the exact manner in which each such conduit may be utilized to optimize the drilling or production operation.

Drill Pipe Coupling

With reference again to FIG. 2, the joining together of multi-conduit tubulars used as drill pipes is accomplished by a threaded coupling collar 84. When so joined, the pressure integrity of each conduit is maintained by a seal 86, the details of which will also be described below.

The end of drill pipe 50 is coupled to the end of drill pipe 52 by a differential thread action between the external pipe threads 88 and 90 and the internal coupling collar threads 92 and 94. Additionally, the ends of each drill pipe have threads 88 and 90 with a different pitch. For example, the end of drill pipe 50 shown in FIG. 2 may have four threads 88 per inch (a pitch of 0.25) and the end of pipe 52 shown may have five threads 90 per inch (a pitch of 0.2). The coupling collar 84 is similarly threaded in that it has coarse threads 92 for engaging the corresponding threads on drill pipe end 50 and finer threads 94 (five threads per inch) at the other collar end to engage with the respective fine threads of drill pipe 52. It is to be noted that both the fine threads 94 and 90 and coarse threads 92 and 88 of both the coupling collar 84 and drill pipes 50 and 52 are uniform diameter threads throughout the respective threaded sections. However, the diameter of the drill pipe end 50 at the coarse thread 88 is larger than the diameter of the drill pipe end at the fine thread 90. The coupling collar 84 has similar thread diameters. The aspect of different thread diameters permits the coupling collar 84 to be unscrewed from drill pipe 50 onto drill pipe 52 wherein the coarse threads 92 of coupling collar 84 do not become engaged with the fine threads 90 of drill pipe 52. In this manner, coupling collar 84 can be lowered onto drill pipe 52 until it abuts stop flange 96.

Because the ends of the illustrated drill pipes include threads of different pitch to provide differential coupling, the threads 88 and 90 are both either right-hand or left-hand threads. Preferably, when pipes are coupled only by the coupling collar 84, the threads will be in the direction wherein the rotary action of the drill tends to tighten the coupling between drill pipes. Typically, the threads are cut in a right-hand direction It is to be noted from the foregoing that the other ends of drill pipes 50 and 52 have thread pitches and diameters opposite that of the described pipe ends. In other words, each pipe has coarse threads 88 at one end and fine threads 90 at the other.

The coupling collar 84 is also of a larger diameter than the coupled drill pipes so that any wear due to rotary action against the bore hole wall will wear the collar 84 rather than the drill pipes. To that end, the drill pipe coupling collar 84 is made removable from drill pipe 52 by leaving a portion 98 on the coupling collar end annularly and internally recessed so as not to engage pipe threads 90. Alternatively, coupling collar internal threads 94 could be extended to the end of the collar. Therefore, when the coupling collar 84 has experienced undue wear, it can be easily removed from drill pipe 52 and replaced. Normally, and for reasons to be discussed below, drill pipes are usually stored or shipped with their respective coupling collars 84 screwed fully onto the drill pipe end in abutting relationship with stop flange 96.

With further reference to FIG. 2, and in keeping with the invention, the ends of drill pipes 50 and 52 are meshed or interlocked before being threadably coupled, to provide a means to transfer the rotational drive torque from one drill pipe to the next. In this manner, the rotational drive torque of the drill string is not transferred by way of the threaded coupling collar 84. Therefore the threaded coupling collar 84 and pipe ends do not need conventional tapered box and pin threaded tool joints to transmit torque, which type of threads require expensive thread dies.

Figure 4:
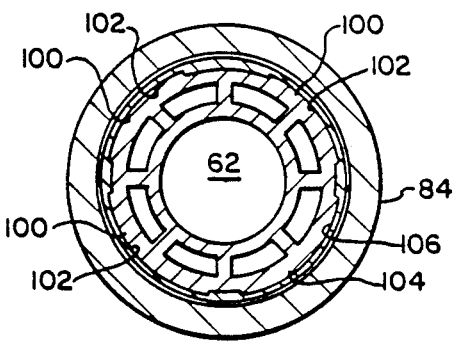
FIG. 4 is a cross-sectional view of coupled multi-conduit tubulars, taken through the coupling collar at line 4—4 of FIG. 2.
Figure 11:
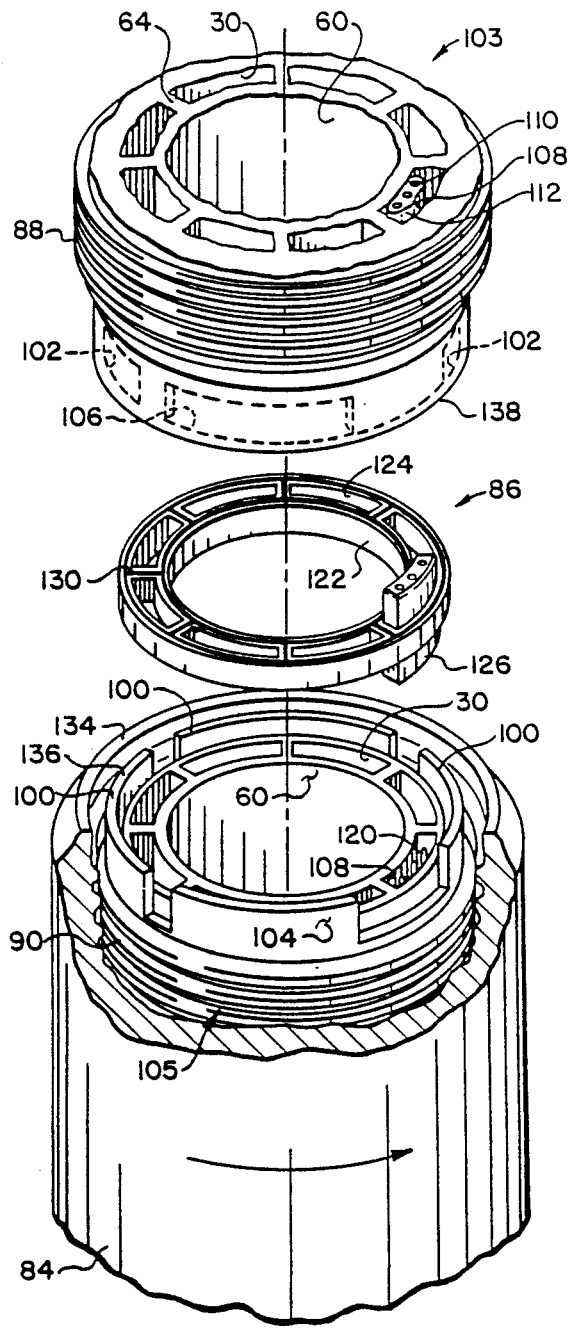
FIG. 11 is an isometric exploded view of a portion of tubular end sections to be joined with the seal.

FIG. 4 illustrates several drive lugs 100 received within respective drive recesses 102 to provide meshing or interlocking between coupled drill pipes. Reference to FIG. 11, which illustrates multi-passageway drill pipes 103 and 105 with electrical wires 110, clearly shows the drive lugs 100 on drill pipe 105, and drive recesses 102 (in phantom lines) on the end of drill pipe 103. The engagement between drill pipes 103 and 105 is essentially an interleaving arrangement of drive lugs 100 and recesses 102.

One lug 104 of drill pipe 105 and respective recess 106 of drill pipe 103 are sized differently than the other drive lugs 100 and drive recesses 102. Specifically, lug 104 is an index lug which, together with index recess 106, provides a way in which one drill pipe 105 may be joined to another 103 at a predetermined desired arcuate or rotational alignment. According to the invention, arcuate alignment between the drill pipes of a string is essential as it is necessary to maintain alignment of the drill pipe conduits throughout the drill string. In addition, it is even more important to maintain a particular arcuate alignment of the drill string pipes, such as 103 and 105, as one conduit, denoted as an electrical conduit 108, carries electrical wires 110 as a medium for supplying signals and power to downhole sensors, and signals upwardly from the sensors or tools to surface equipment. The term "signals" as used herein is intended to also encompass electrical power, such as from alternating current (ac) or direct current (dc) sources.

Therefore, it is seen that not only is it necessary to maintain alignment between the fluid carrying conduits, but also to maintain a particular alignment because one such conduit 108 carries electrical wires. It is realized that in those applications where it is desired to use every conduit of the drill pipe for fluids, it is only necessary to provide drive lugs 100 and drive recesses 102 which maintain alignment of the conduits in general, but not for particular conduits. It is also expected that in some instances more than one conduit will carry electrical wires 110.

Electrical Conduit and Conductors

As noted above, the capability of a drilling operation to receive instantaneous electrical signals from downhole sensors, such as 18 and 20, and operate in a closed loop manner can be advantageously used to modify procedures for optimizing the operation. As noted in FIGS. 7–10, an electrical conduit 108 of the drill pipe 103 carries three electrical wires 110 formed together in a harness 112. The harness 112 is preferably constructed with a durable cover, such as Teflon or Kyner material so that any frictional movement between the harness 112 and interior surface 114 of the conduit 108 during drilling will not result in an electrical short circuit.

Each electrical wire 110 is terminated at the pipe end in a connector block 116 having three wire terminals 118 and associated pin contacts 120. Each electrical wire 110 is soldered to a terminal 118 of its respective pin contact 120. The connector block 116 at each end of a drill pipe may be cemented or otherwise sealed within the electrical conduit 108, or attached therein by other suitable hardware (not shown).

Conduit Seal

In maintaining electrical continuity, as well as fluid continuity between the respective conduits of one drill pipe to another a seal 86 is provided as shown in FIG. 5. The seal 86 is planar in nature and cross-sectionally shaped similar to that of the illustrated drill pipe. Particularly, the seal 86 of FIG. 5 is cross-sectionally similar to the tubular embodiment of FIG. 3a, and is constructed as a steel plate-like insert positioned between the drill pipe ends. From the description which follows, it is well within the ambit of those skilled in the art to construct conduit seals for use with the tubulars of FIGS. 3b–3d. As shown in FIG. 5, the seal 86 includes a central passage 122 and equidistantly spaced individual peripheral passages 124 therearound. In one such passage, an electrical socket-type intermediate connector 126 is fixed, as shown in FIGS. 5–7. The intermediate connector 126 has socket contacts 128 in each end thereof and into which the pin contacts 120 of the pipe connector blocks 116 are frictionally insertable to assure high quality electrical connections from drill pipe to drill pipe. Moreover, the socket contacts 128 and pin contacts 120 are plated with gold or other suitable material to avoid the adverse oxidation effects prevalent in the well drilling environment.

Intermediate connector 126, as with the drill pipe connector blocks 116, may be cemented or otherwise fixed into the seal plate 86. Alternatively, the intermediate connector 126 may be provided with mounting hardware for "floating" the connector within the seal 86. This aspect allows the intermediate connector 126 a certain degree of lateral movement within the seal 86 to accommodate small dimensional differences between aligned drill pipes.

The provision of the seal 86, as well as the intermediate connector 126, is a departure from the customary drill pipe electrical connections. The intermediate connector 126 is of great practical advantage insofar as it permits both drill pipe ends to be fitted with pin contact-type connector blocks 116. With this symmetrical arrangement, the seal 86 has no right side up orientation, but rather can be quickly installed with either end of the intermediate connector 126 applied to either pipe end. In addition, the manufacture of the exemplary drill pipe is simplified as only a pin type connector block 116 need be installed in the electrical conduit 108 of each pipe end.

Importantly, the seal 86 includes a sealing or gasket means in the nature of a rubber or elastomer 130 encircling each of the peripheral passages 124, including the central passage 122. In the preferred form of the seal 86, a groove 132 is cut into each face side of the seal 86, circumscribing the seal network around adjacent peripheral and central passages 124 and 122. For ease of construction of both the seal 86 and the elastomer gasket 130 the groove 132 between adjacent passages is common thereby enabling the elastomer gasket 130 to be made in a single piece. As noted in FIG. 6, when drill pipes 103 and 105 are interlocked together and firmly coupled by the collar 84, the elastomer gasket 130 is squeezed tightly within its groove 132 to form a high quality seal and insure the pressure integrity between the respective fluid and electrical conduits. With this type of seal, pressure differentials upwardly of 50,000 p.s.i. may be sustained between adjacent conduits. This seal arrangement represents an advance over the "O" rings or chevron seals which can withstand differential pressures upwardly of only about 7,500 p.s.i. For clarity, the electrical connector blocks 116 in the electrical conduit ends of FIG. 6 have been omitted.

An additional advantage of the drill pipe according to the invention can be seen from FIG. 11 where the coupling collar 84, as it is shown, is abutted against the stop flange 96 (not shown). The coupling collar 84 is of such a length that when completely receded on drill pipe 105 the terminal edge 134 thereof is at least flush with the terminal edges 136 of the lugs so that such lugs cannot be easily broken or damaged during storage or handling. In the same vein, and to reduce vulnerability to damage, the terminal end of the mating drill pipe 103 has a continuous cylindrical rim 138 therearound with the drive and index recesses 102 and 106 on the inside surface thereof. Therefore, because of the continuous nature of the rim 138 the terminal end of such drill pipe 105 is less susceptible to damage. This is highly desirable as it can be seen that an entire drill pipe can become unreliable if the lugs 100 and 104 or recesses 102 and 106 become excessively damaged.

With the foregoing in mind, it can be appreciated that many drill pipes can be quickly and easily coupled together in a desired arcuate alignment, with each fluid passage and electrical conduit maintaining its integrity throughout the drill string.

Quill Section

Figure 12:
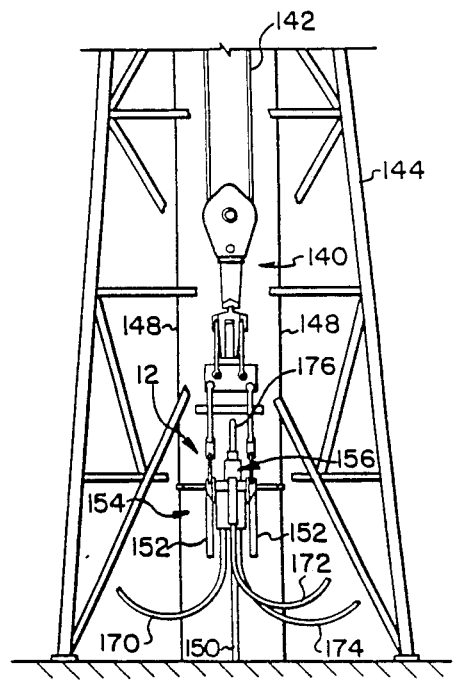
FIG. 12 is front elevational view of an exemplary well drilling derrick showing the gooseneck swivel and attached drill pipe suspended therefrom.
Figure 13:
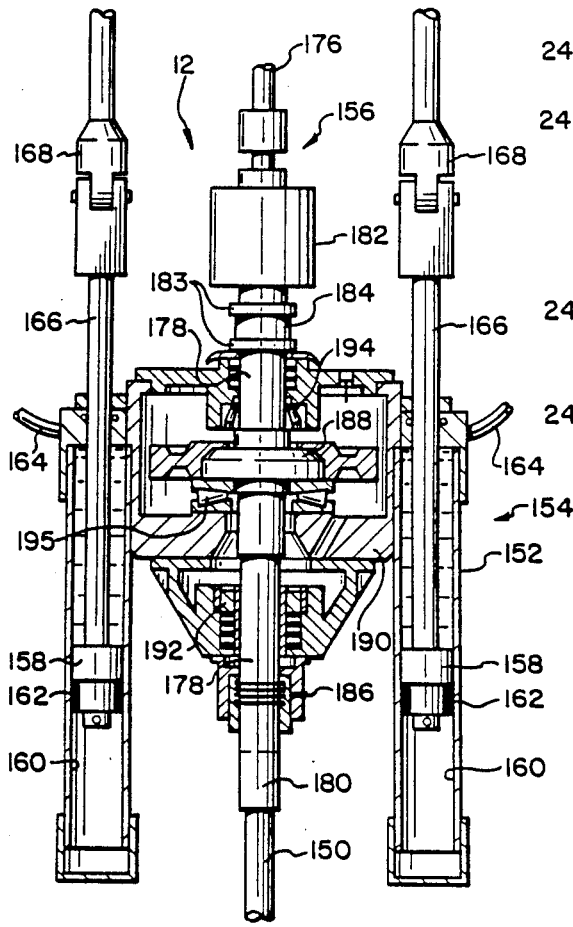
FIG. 13 is a cross-sectional side view of the gooseneck swivel illustrating the placement of the fluid and electrical commutators on the quill section, together with the drill pipe drive equipment.

Central to a principal feature of the invention, there is shown in FIGS. 12 and 13 the surface apparatus of the drilling operation utilized to communicate fluids and electrical signals to and from the drill string. A hoist structure 140, suspended from a cable 142 connected to a derrick frame 144, holds the gooseneck swivel 12 in suspension above the well head (not shown). Cable take-up and release means (not shown) provide gross adjustments of the drill string within the well bore, and thus gross adjustments of the drill, bit weight. Torque arresting cables 148 prevent the goose neck swivel 12 from rotating together with the topmost drill pipe 150.

Fine vertical adjustments of the gooseneck swivel 12 above the well head are supplied by a pair of gas-over-oil hydraulic cylinders 152 supporting the quill 154 and washpipe 156 sections of the gooseneck swivel 12 to the hoist structure 140. As noted in FIG. 13 the hydraulic cylinders 152 each have a piston 158 located in a partially fluid-filled cylinder 160 for maintaining a desired drill bit weight. Each piston 158 includes circumferential seals 162 therearound to seal each such piston 158 against the inner wall of the cylinder 160 and maintain the oil above the piston 158 separate from atmospheric pressure below the piston 158. The upper portion of each hydraulic cylinder 152 is coupled to a gas-over-oil source (not shown) by hoses 164. It can be appreciated then that a high gas pressure in the source results in a lightened drill bit weight. A piston rod 166 of each hydraulic cylinder 152 is connected to the hoist structure 140 by knuckle joints 168. Various fluids are coupled to the gooseneck swivel 12 through high pressure hoses 170, 172 and 174 of FIG. 12. High pressure hose 176 atop the gooseneck swivel allows fluid to be pumped down or extracted from the central bore of the drill pipe 150.

In the description and drawings hereof, certain elements common to drilling operations, such as the motor drive of the drill string, the blow-out preventer at the well head, etc., have been omitted or only briefly described as such elements do not contribute to the invention and the existence and use thereof is well within the competence of those skilled in the art.

The gooseneck swivel 12 of FIG. 13 is primarily comprised of a quill section 154, which includes a quill shaft 178 connected at its bottom end to the top-most drill pipe 150 with a tubular collar 180, a washpipe 156 and fluid commutator 182. An adaptor 184 is effective in coupling the fluid commutator 182 to the quill shaft 178. The adaptor 184 as well as the quill shaft 178 have fluid passages therein for communicating desired fluids to ones of the drill pipe conduits. The manner in which various fluids are commutated to desired drill pipe conduits will be treated more fully below.

The gooseneck swivel 12 further includes an electrical commutator 186 for maintaining electrical connections to each of the drill string wires 110 while the drill string is rotating. The quill shaft 178 is driven by a gear 188 splined to the quill shaft 178 through a hydraulic or electric motor (not shown) The motor drive unit is housed in a frame 190 through which the quill shaft 178 rotates in bearings 192, 194 and in thrust bearings 195. Suitable oil seals are also provided for shaft 178.

Fluid Commutator

Figure 14:
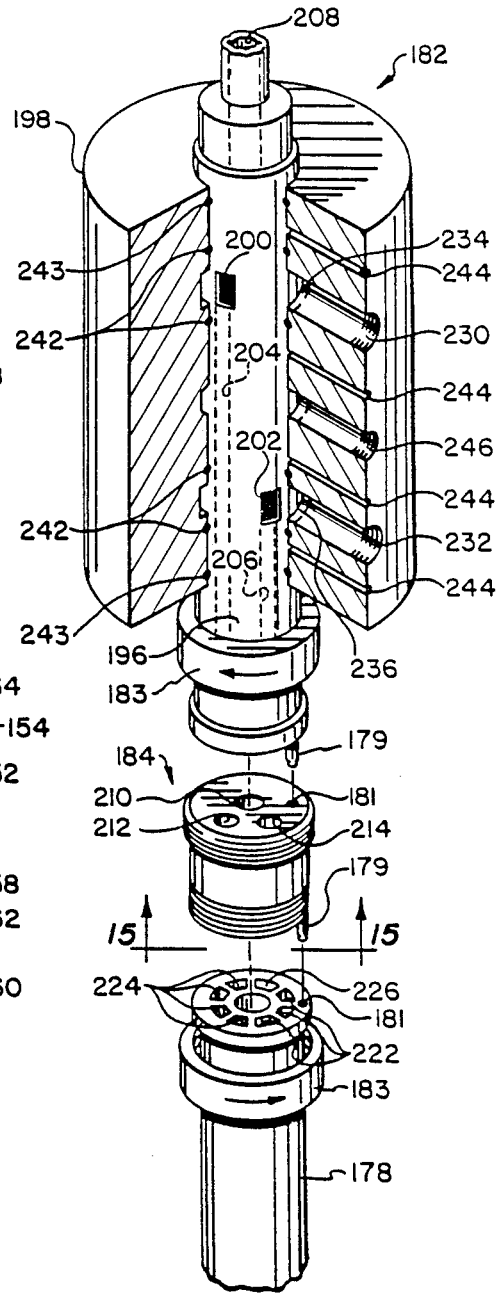
FIG. 14 is an isometric view of the fluid distribution manifold and the commutator shaft, with a portion of the manifold quarter sectioned to illustrate the shaft inlet ports in fluid communication with the annular grooves of the manifold.

A simplified version of the fluid commutator 182 is shown in FIG. 14 wherein a commutator shaft 198 is rotatable within a fluid manifold 198 and includes high pressure seals which will be thoroughly discussed in connection with FIG. 16. Commutator shaft 196 includes a number of inlet ports 200 and 202 corresponding to the different number of fluids desired to be pumped through the various drill pipe conduits For exemplary purposes, only two fluid sources are connected to the fluid commutator 182. For each inlet port 200 and 202 there is a corresponding fluid passage 204 and 206 (shown in phantom) within the commutator shaft 196, each such passage having an outlet on the bottom end of the commutator shaft 196. The commutator shaft 196 also has a central bore 208 therethrough and through which drill fluid or the like is communicated to the central conduit 62 of the drill pipe 150.

Fluid Conduit Adaptor

Figure 15:
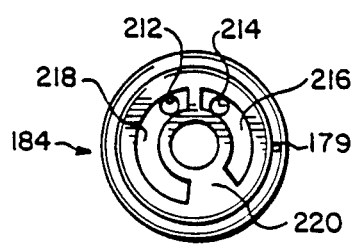
FIG. 15 is a bottom view of the adaptor of FIG. 14 illustrating the manner in which two or more pipe conduits may be commoned with a single commutator shaft passage.

The adaptor 184 provides an interface between the commutator shaft 196 and the quill shaft 178. The adaptor 184 is secured between the commutator shaft 196 and quill shaft 178 by a pin 179 and recess 181 arrangement, and jam nuts 183. FIG. 14 illustrates a perspective top view of the adaptor 184 having a central bore 210 in communication with the commutator shaft central bore 208, and two channels 212 and 214 in communication with the commutator shaft passages 204 and 206. FIG. 15 illustrates the configuration of the bottom side of the adaptor 184. In the illustrated embodiment of the quill section 154, it is desired to pump two different fluids down various drill pipe conduits. Therefore, the bottom side of adaptor 184 includes hollowed-out areas 216 and 214 around respective passage channels 214 and 212. With this construction, channel 214 is placed in fluid communication with three corresponding quill shaft conduits 224, while channel 212 is placed in fluid communication, for example, with four other corresponding quill shaft conduits 222. The remaining conduit 226 in the quill shaft 178 is plugged by the non-apertured area 220 on the adaptor 184.

Essentially then, inlet port 204 of the commutator shaft 196 is capable of distributing one type of fluid to four adjacent quill shaft conduits 222, and thus four corresponding drill pipe conduits. Similarly, inlet port 202 is adapted to distribute another drill fluid to three adjacent drill pipe conduits It should be apparent now that a variety of adaptors may be provided at the drill site for use in distributing fluids of a number of fluid sources to a number of drill pipe conduits. This is accomplished by providing different configurations of hollowed-out areas within or on the bottom side of the adaptor 184.

Moreover, drilling operators may find from the teachings of the present invention that more than two fluid sources at different pressures can be used to optimize the drilling operation. In that event, it will be apparent from the description the manner in which a three or four inlet port commutator may be developed to distribute a like number of different fluids to the drill pipe conduits.

Figure 16:
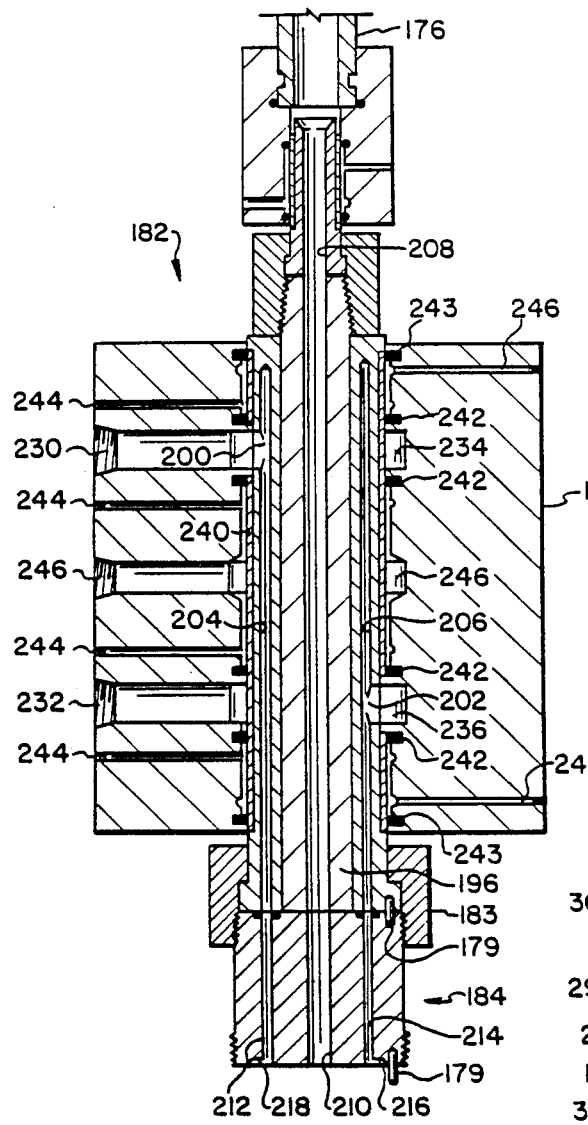
FIG. 16 is a side cross-sectional view of the fluid commutator illustrating the connection of the manifold annular grooves to the respective various shaft inlet ports, and the connection through the shaft passages to the quill section.

In FIGS. 14 and 16, and in more detail, the fluid manifold 198 has input passageways 230 and 232 connected on the outside thereof to respective fluid sources, and on the inside thereof to commutator shaft inlet ports 200 and 202 by a pair of annular grooves 234 and 236. Inlet port 200 is therefore in continuous communication with fluid as it rotates within its respective annular groove 234. Similarly, inlet port 202 is in continuous communication with another fluid by way of its annular groove 236.

Because the fluid commutator 182 is subjected to fluid pressures limited only to the strength of connecting hoses 170-174 (FIG. 12), a special arrangement must be provided for maintaining a seal between the annular grooves 234 and 236 and the rotating commutator shaft 196. The high pressure sealing arrangement more clearly depicted in FIG. 16 is utilized in the fluid commutator 182 of the gooseneck swivel 12 so that the various high pressure fluids can be used to facilitate the downhole drilling operation. The exterior surface of the commutator shaft 196 is faced with a ceramic material 240 which provides a durable and long lasting bearing surface for the shaft 196 within the fluid manifold 198.

Around each annular groove 234 and 236 are high pressure seal rings 242 which seal the fluid manifold 198 to the ceramic facing 240 of the commutator shaft 196. Low pressure seals 243 are disposed on opposing ends of shaft 196. To counteract the high pressure exerted on one side of a high pressure seal 242, another high pressure control fluid is applied to the opposite side of the high pressure seal 242. In this manner, the differential pressure on each side of the high pressure seal 242 is reduced and the possibility of pressure blow outs is also reduced. Accordingly, high pressure seal fluid inlet ports 244 have been provided, as shown in FIG. 16, for supplying a fluid under high pressure to one side of each high pressure seal ring 242, to equalize the pressure on the other side of the high pressure seal rings 242 resulting from high pressure drill fluids pumped down the drill pipe conduits. A number of low pressure seal fluid outlet ports 246 have been provided for returning the leakage pressure control fluid which equalizes the high pressure seals 242 back to a reservoir (not shown).

Without repeating the details of high pressure sealing, the central bore 208 in the commutator shaft 196 may be sealed by the same high pressure technique discussed above.

It should be understood that the invention, according to the foregoing description affords a drilling operator the ability to selectively inject a different number of extremely high differential pressure fluids into any number of different drill pipe conduits and apply the fluids to downhole equipment to, for example, clean or cool drill bits, aerate drilling fluid or aid the cavitation or erosion of the formation, or effect each operation simultaneously.

Electrical Commutator

Figure 17:
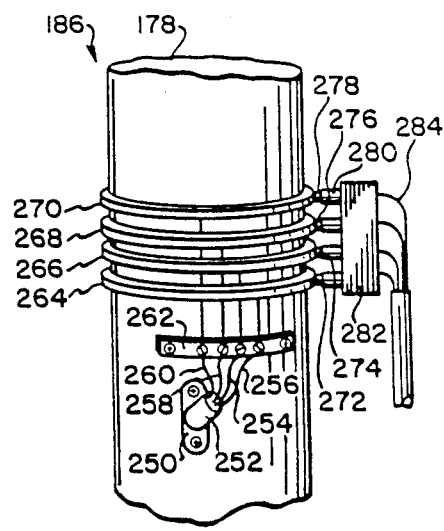
FIG. 17 illustrates the electrical slip rings on the quill shaft, with the corresponding brushes for communicating electrical signals to or from the drill pipe wires.

An electrical commutator, generally designated 186 in FIG. 17 provides continuity of electrical connections between the rotating wires 110 within the drill pipe, and the surface monitor equipment 22. The drill pipe electrical wires 110 are coupled from the topmost drill pipe 150 and through a corresponding connector (not shown) at the bottom of the quill shaft 178. Electrical wires within the quill shaft 178 are also provided with a connector 250 at their top end and are finally connected to connector 252 of FIG. 17. For exemplary purposes here, four electrical wires are carried through the drill pipes 150. Four corresponding conductors 254, 256, 258 and 260 are fastened to a terminal block 262. From the terminal block 262 each of the four conductors are connected to a respective slip ring 264, 266, 268 and 270. The slip rings are constructed of brass, or other suitable electrically conducting material, are fixed to the quill shaft 178 and thus rotate with such shaft.

The electrical signals carried by the respective wires 110 from the downhole sensors are thus present on each of the respective rotating slip rings 264–270. Four brushes 272, 274, 276 and 278 are held in compression against the respective slip rings to provide a reliable electrical contact therewith. The brushes are stationary and are pressed against the respective slip rings by brush holders, such as shown by reference character 280. The brush holders are fixed in a block 282 which, in turn, is fastened to the gooseneck swivel frame. Within the block 282, individual conductors such as 284 are connected to the individual brushes 278 to carry the electrical signals to the monitor equipment. The electrical commutator 186 is covered by a protective cover (not shown) to avoid exposure of the slip rings to the harsh well drilling environment.

It is seen, therefore, that the invention provides for a number of electrical wires 110 to be routed through the drill string to downhole apparatus. The electrical signals from the downhole apparatus are instantly available to the surface monitor equipment 22 and can thus be acted upon accordingly.

Cross-Over Sub

Figure 18:
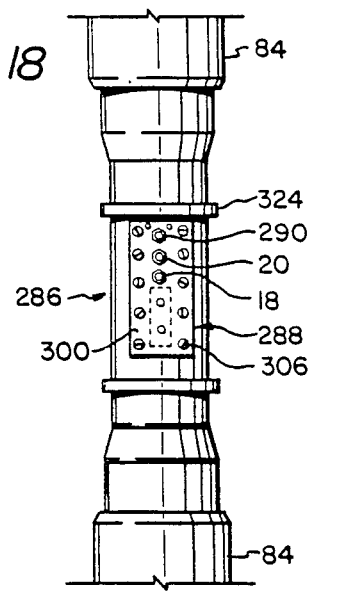
FIG. 18 is a side plan view of a cross-over sub according to the invention with sensor equipment attached thereto.
Figure 19:
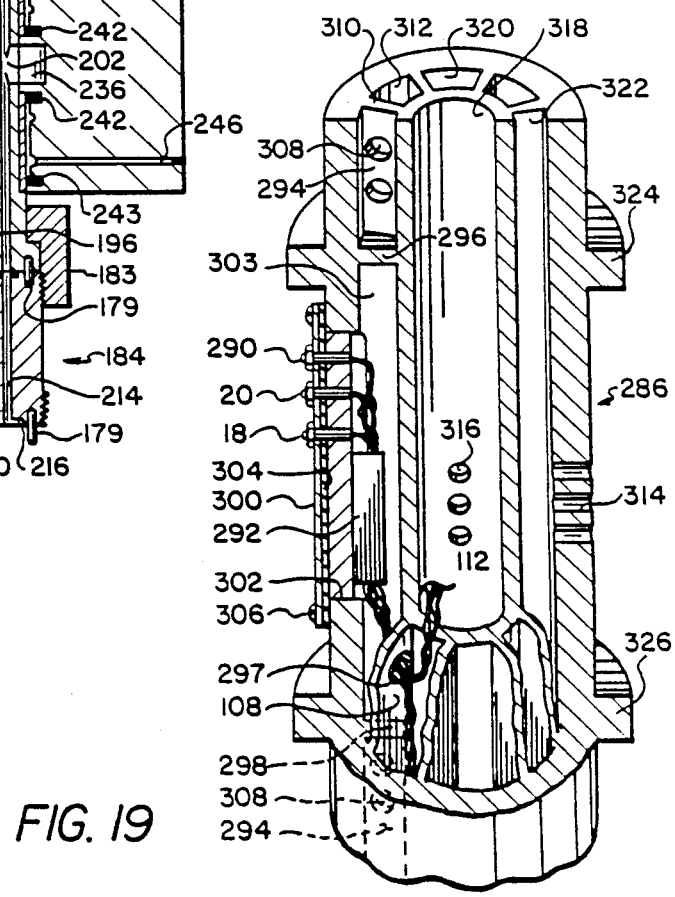
FIG. 19 illustrates a cross-over sub cross-sectioned to show a blocked portion of a fluid conduit used to house downhole sensors and telemetry equipment, with cross-over apertures around the blocked conduit portion.

With regard to a further feature of the invention there is illustrated in FIGS. 18 and 19 a cross-over sub 286 which is ideally suited to operate in conjunction with the improved drill pipe to expand its versatility. The cross-over sub 286 is a short section of drill pipe with collar couplings as described above, and with a provision for sensor equipment generally designated 288. Specifically shown are three sensors, a pressure sensor 290, a pH sensor 20 and a temperature sensor 18.

Each sensor is electrically operated and is thus connected to telemetry or transducer apparatus 292 for converting the sensor physical inputs to electrical signals for transmission to the surface monitor equipment. As shown, the telemetry apparatus 292 is wired to the electrical wire harness 112 which extends upwardly in the drill string to the slip rings. The wire harness 112 is disposed in the electrical conduit 108.

Because there may be insufficient room in the electrical conduit 108 for sensors and telemetry equipment, a part of a fluid conduit 294 has been blocked off by separators 296 and 298. A duct 297 connects the blocked off portion 303 with the electrical conduit 108 so that electrical wires 110 can be routed from the electrical conduit 108 to the telemetry equipment 292 located in the blocked off portion 303. An access and mounting plate 300 mounts into an access opening 302 in the blocked off portion 303 of the fluid conduit 294. The mounting plate 300, along with a gasket 304 is secured by screws 306 to the wall of the cross-over sub. A conventional rubber gasket 304 is sufficient as the blocked conduit 303 is not subjected to extreme pressures.

A plurality of cross-over openings 308 are formed into conduit divider 310 for allowing the fluid from the upper part of conduit 294 to be rerouted through fluid conduit 312, around blocked off conduit portion 303, and back into the lower part of conduit 294.

In order to reduce the hydrostatic head at the bore site it is customary to aerate the drill fluid. Accordingly, the exemplary cross-over sub 286 is provided with external aeration apertures 314 for aerating the drill fluid in the annulus 44 of the wellbore, and internal aeration apertures 316 for aerating the drill fluid in the central conduit 318. As noted from FIG. 19, to provide internal and external aeration, fluid conduits 320 and 322 which are connected to the respective central conduit 318 and the well bore annulus by the noted apertures, are provided with a pressurized gas such a nitrogen It should be apparent that a single cross-over sub 286 may not normally include all the features of the illustrated sub. Also, specialized drill pipes of the above described type may be fitted with one or more of the features described in connection with the cross-over sub 286.

Collets 324 and 326 provide protection for the sensors against damage either during storage or when used downhole. The collet 324 also acts as a stop for the coupling collar 84.

The cross-over sub 286 therefore provides a means in which to mount environmental formation sensors in the drill string, while yet permitting fluid flow in each fluid conduit. It is realized that when using the cross-over sub 286 the same fluid should be pumped into conduits 294 and 312 since such conduits are placed in fluid communication by the openings 308.

Annular Accumulator

Figure 20:
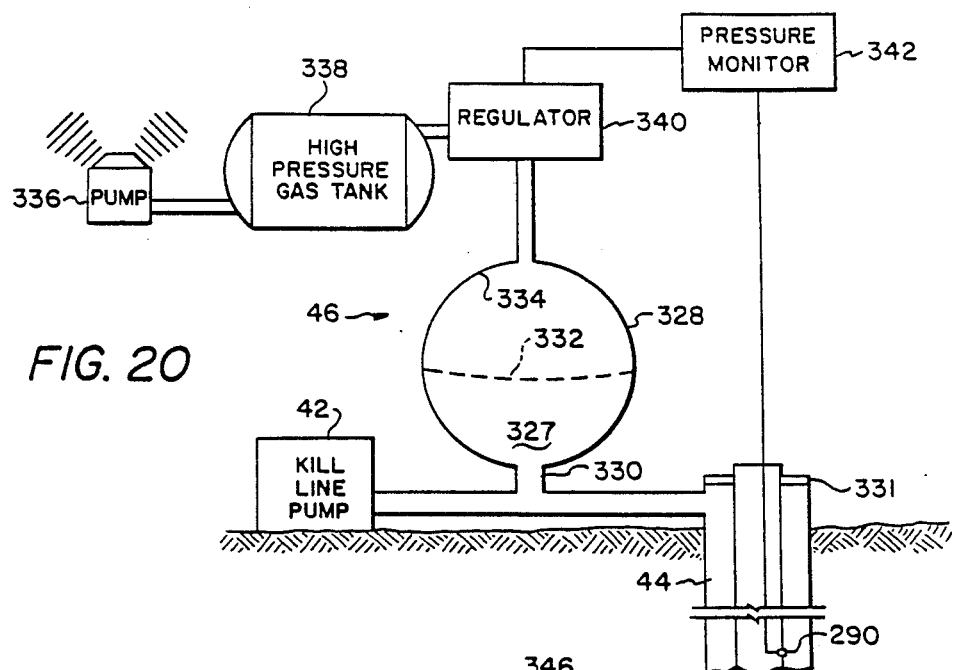
FIG. 20 illustrates in symbolic form the components of the annular accumulator for applying a desired pressure to the drill fluid in the annular area of the well.

An annular accumulator 46 is shown in FIG. 20. This apparatus enables selective mechanical adjustments in the wellbore hydrostatic head for improved wellbore integrity and to provide the ability to make continuing adjustments as differing geopressures are encountered. Specifically, this apparatus prevents those events from occurring which can lead to a disastrous and costly well blowout. Normally, an excessive building of pressure downhole is counteracted by increasing the density of the drill mud in the annulus 44 of the wellbore. In the event pressure builds up too quickly, or if the drilling operators are inattentive to such buildup, the drill mud density cannot be changed quickly enough to avert a blowout.

The annular accumulator 46 addresses this very problem by providing the capability of quickly changing the effective density of the drill mud 327 by applying pressure thereto in the wellbore annulus 44. The annular accumulator 46 comprises a reservoir 328 connected to the wellbore annulus 44 through appropriate plumbing 330. A rotating head 331 forms an annular seal around the drill pipe to provide a closed system.

The reservoir 328 includes a flexible diaphragm 332 which separates the drill mud 327 from the pressurized gas 334 thereabove. It is seen that with an increase in the gas pressure on the diaphragm 332, and thus on the drill and mud 327, the effective density of such mud is increased. A gas pump 336 compresses a gas into a relatively large volume supply tank 338 so that on demand the gas pressure 334 in the accumulator reservoir 328 can be quickly increased. A regulator 340 is adjustable and permits a regulation of the gas 334 between the supply tank 338 and the accumulator reservoir 328. Thus, on an indication of a pressure adjustment requirement, the regulator 340 may be opened to increase the gas pressure on the drill mud 327, and thus increase its effective density.

According to an important aspect of the invention, the regulator 340 can be automatically adjustable, and connected to a surface pressure monitor 342 for automatically adjusting the accumulator reservoir 328 pressure based upon instantaneous downhole pressure changes sensed by the pressure sensor 290. Therefore, through the closed loop system imminent blowout catastrophes can be detected early and avoided with the present invention. In addition, the pressure monitor 342 can be utilized to initiate operation of pump 42 in order to maintain the downhole fluid levels at the desired magnitude.

Improved Drilling Method

Having described the apparatus of the invention in what is conceived to be the most practical and preferred embodiment, an improved method of drilling, using such apparatus will now be described. With this in mind, attention should be directed to FIGS. 21-23 where there is illustrated an enlarged drill pipe and wellbore utilizing the various features of the invention.

Figures 21, 22, 23:
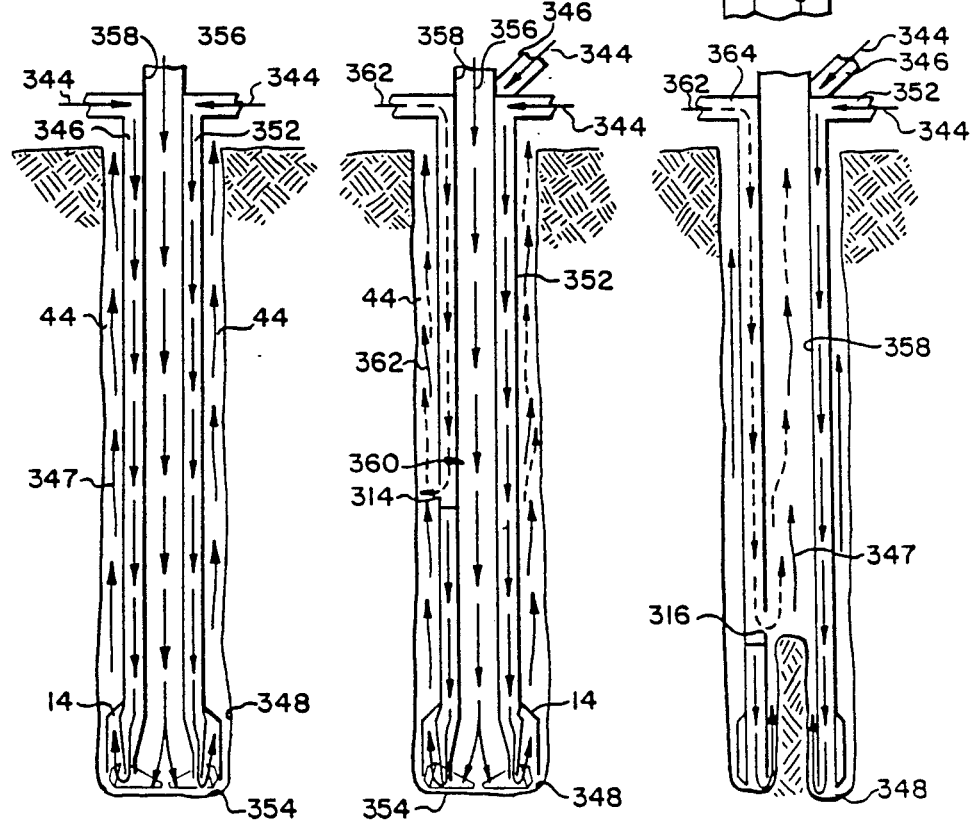
FIG. 21 is a sectional plan view of the multi-conduit drill pipe and attached bit using a high velocity fluid in some conduits for cutting the formation and cleaning the drill bit, and illustrating other low pressure fluids in other conduits for carrying cutting chips upwardly around the annulus area.
FIG. 22 is another view similar to that of FIG. 21 wherein a gas is forced down one drill pipe conduit, and vented downhole for decreasing the hydrostatic pressure thereat.
FIG. 23 illustrates a drilling operation employing a liquid and gas reverse circulation and coring technique.

In FIG. 21 there is shown a method of drilling using a liquid 344, such as a drill fluid of a first density, pumped downhole in one or more conduits 346 to facilitate the removal of formation chips 347 from the drill bit 348 area through high velocity jetting action. The chips 347 suspended in the drill mud are carried upwardly in the wellbore annulus 44 to the surface. The drill fluid 344 is also pumped downhole in other conduits 352. In these conduits 352 the drill fluid 344 is under considerably more pressure than that in conduit 346 and is directed into the drill bit boring path 354 to erode the formation and/or quickly remove the chips 347 out of the boring path 354. Drill fluid 356 of a second density may be pumped down the drill pipe central conduit 358 in large quantities, and at the drill bit area 348 be mixed with the drill fluid 344, the combination of which is forced upwardly in the wellbore annulus 44 carrying formation chips 347.

Accordingly, with the provision of the multi-conduit drill pipe drilling operators are able, for the first time, to independently and simultaneously pump downhole a drill fluid at a pressure adequate to clean the cuttings from the drill bit and drill path, pump a drill fluid at an extremely high pressure to erode the formation, and pump yet another drill fluid at a large volume and low pressure downhole to force cutting chips upwardly in the well bore annulus.

The drilling operation represented in FIG. 22 is similar to that of FIG. 21, but in addition includes one type of cross-over sub 360 in which a pressurized gas 362 is pumped through external aeration apertures 314 into the wellbore annulus 44 to aerate the mixed density drill fluid thereby reducing its effective density. Stated in another way, this aeration reduces the hydrostatic pressure in the drill bit area 348. It can be appreciated then that between the aeration in this example and the pressure exerted on the drill fluid by the annular accumulator 46, the density of the drill fluid can be quickly changed, and changed within a wide range.

FIG. 23 illustrates a coring operation wherein the high pressure drill fluid 344 is applied to the drill bit area 348 through certain conduits 346 and 352 and through jets (not shown), and reverse circulated upwardly with the formation chips 347 through the central conduit 358 of the drill pipe. In addition, reverse circulation of the drill fluid 344 is enhanced by aeration in the nature of compressed gas 362 pumped down fluid conduit 364 and expelled into the central conduit 358 through internal aeration apertures 316. Fluids can alternatively be injected into the outer annulus of the drill pipe to properly condition the outer area.

It will also be understood that the configuration shown in FIG. 23 could be modified by utilization of the drill bit 14 of FIG. 21. In this embodiment, the chip size will be reduced in order to enhance full pneumatic transfer uphole.

From the foregoing, an improved well drilling apparatus and method have been described. It can be appreciated that many of the various aspects and features described above may be combined to further enhance the drilling operation. For example, sensors other than those disclosed can be mounted to the drill pipe to sense desired formation data, much like the pressure sensor as noted above, and be coupled to surface equipment to modify the drilling operation. Such a closed loop system eliminates the intervention by operators who may delay in acting upon the information, or not act at all. Moreover, such a closed loop operation permits continuous adjustments, of whatever magnitude, on the drilling operation with the aim of optimizing the system efficiency.

In an important aspect of the invention, the three functions of (1) maintaining chemical and pressure integrity in the wellbore, (2) circulation of cuttings out of the hole, and (3) assisting in the cutting or erosion of the formation are able to be isolated and therefore independently manipulated and controlled. The present invention can thus use multiple and separate fluids, and combinations thereof, to perform the three functions noted above. This ability contrasts with the prior art wherein the three above-noted functions were not able to be isolated and independently manipulated or controlled.

Multi-Conduit Well Casing

Another principal aim of the invention is the provision of a well casing with multiple conduits. The provision of a multi-conduit well casing engenders a number of advantages as broad in scope as that discussed above in connection with drill pipes.

It is appreciated by those familiar with the art that even after a well has reached its production stage, a highly developed well management schedule must be performed to assure that the well is producing at its peak efficiency. The overall production management of a well has heretofore been limited by the amount of downhole information which can be gathered to either change the downhole conditions to improve efficiency, or to change the surface pumping operation in an attempt to improve the overall efficiency. Much like the well drilling operation described above, with the provision of the transmission of multiple fluids and electrical signals, a highly efficient closed loop well production system can also be achieved.

Among those items which must be addressed in a highly developed production system are downhole conditions relating to zone pressures and temperatures, flow rates, fluid viscosities and densities, fluid pH levels, etc. It is advantageous to monitor these parameters, and others, to control surface operations to, for example, control the pressure of a gas forced downhole to decrease the hydrostatic pressure thereat and inject solvents or solutions downhole to break up the oil or adjust the pH level. Other solutions may be simultaneously pumped downhole to further affect the formation so that additional oil, or the like, is released Other applications may require the injection of an alcohol solution, or an anti-freeze agent, downhole to prevent undesirable low temperature conditions due to the temperature lowering affect of a gas flow.

From the foregoing, it can be seen that it is highly desirable to have available the ability to simultaneously pump a number of liquids downhole and monitor a plurality of downhole parameters. In accordance with the invention, FIGS. 24 and 25 are illustrative of a multi-conduit well casing 366 which can be employed to overcome the shortcomings attendant with the well casings heretofore known. The general characteristics of the well casing 366, as well as the arrangement for coupling casings together to form a string, are the same as that described above in connection with drill pipes. Because various conduits of the casing 366 may also carry high pressure fluids, a seal 86 (FIG. 27) which is comparable to the seal of FIG. 5, assures the pressure integrity between the conduits of the well casing 366.

In particular, FIG. 25 illustrates a cross-sectional configuration of the well casing 366, including a central bore 370, a plurality of fluid conduits 372, and electrical conduit 374 carrying a plurality of telemetry wires 376. Each of the telemetry wires 376 is has a connector at the electrical conduit ends, and joined through the intermediate connector 126 of the seal 86 to corresponding telemetry wires of other well casing sections of the string. It should be noted that the multi-conduit well casing 366 of FIG. 25 is generally the same as the multi-conduit drill pipe of FIG. 3b, except the well casing tubular is somewhat larger in cross-section to fit within the well bore. In addition, the central bore 370 is somewhat larger in diameter to accommodate the larger volume of production fluid pumped upwardly.

With reference to FIG. 24, the topmost well casing 366 is coupled by a collar 84 to well head cap depicted by reference character 378. A well head cap stub 380 is similar in cross-section to the well casing 366, and includes provisions for a seal 86 (not shown), as well as the index and drive lugs and recesses discussed above in connection with FIG. 11. The well head cap 378 includes a plurality of channels 382 (shown in phantom) therethrough connecting each well casing conduit 372 and 374 to a respective fluid or solution supply, and monitor and control panel 394. In the illustrated embodiment of the invention, each of the seven fluid conduits 372 of the well casing 366 is connectable through a fluid distributor 386 to each of the fluid sources indicated by 388. High pressure hoses, such as that shown by hose 384 connect each of the well head cap channels 382 to an outlet 390 of the fluid distributor 386.

The telemetry wires 376 in the electrical conduit 374 are coupled through the well head cap electrical conduit 392 (shown in phantom) to a monitor and control panel 394. The monitor and control panel 394 may include meters, alarms, graphical monitors or amplifiers to transform the telemetry signals into other forms to, for example operate a bank of solenoid-equipped valves (generally designated 396) such as used in connection with the fluid manifold 397 of the fluid distributor 386.

In this manner, a closed loop system is provided in which the surface equipment may be automatically operated in response to changing downhole parameters sensed by sensors. For example, in response to an indication of an increased viscosity of the production fluid downhole, as sensed by a sensor 424 (to be discussed in more detail below), the monitor and control panel 394 will process the electrical indication thereof and cause one of the solenoid operated valves 396 to be operated to thereby connect an alcohol fluid source through the fluid distributor 386 to one or more of the well casing fluid conduits 372 such that the viscosity of the production fluid is changed. Moreover, as the viscosity sensor transmits to the monitor and control panel 394 the instantaneous viscosity of the downhole production fluid, one or more other solenoid operated valves 396 may be operated or released to increase the amount of fluid by routing such fluid to other fluid conduits 372, or decrease the amount of fluid pumped downhole by decreasing the number of fluid conduits 372 through which such solvent is pumped.

While the solenoid operated relays 396 and the manifold arrangement have been shown in general, specific arrangements may be devised by those familiar with the art.

A manual push button panel 400 is also provided for manually operating the solenoid operated valves 396 so that any one of the fluids can be pumped through any one or more of the well casing fluid conduits 372.

The well head cap 378 also includes a central bore (not shown) through which a pump shaft 402 extends downhole to provide the pumping action by which the production fluid is elevated to the surface.

The bottom-most part of the well casing comprises a well casing stub 404 which provides an outlet for each of the fluid conduits 372, as well as the electrical telemetry sensors. The well casing stub 404 is threadably coupled to a special multi-conduit tubular 406 which houses a conventional reciprocating plunger to elevate the production fluid to the surface.

FIGS. 26 and 27 depict the various features of the well casing stub 404. As viewed from below, the well casing stub 404 (FIG. 26) includes a mesh screen 408 covering the central bore 370, and is of a desired grade so as to prevent sand particles, and the like, from entering into the pump section 406. The mesh screen 408 is constructed of stainless steel, or other similar durable material resistant to corrosion, and includes holes around its peripheral edge aligned with the fluid conduits 372 so that the fluid may be jetted out of the bottom of the well case stub 404 unrestricted by the mesh screen 408. The mesh screen 408 is retained within the well casing stub 404 by being clamped between a shoulder 410 of collar 412 and the conduit terminal end 414. The conduit terminal end 414 of the stub 404 includes plural fluid conduits 372, a central bore 370 and an electrical conduit 374 all in registry, through the multi-conduit pump section 406, with corresponding conduits of the multi-conduit well casing 366. In addition, the well casing stub 404 includes drive and index lugs matable with respective drive and index recesses on the multi-conduit pump section 406. As noted above, seal 86 assures the pressure integrity between the corresponding conduits of the well casing stub 404 and the multi-conduit pump section 406.

As noted in FIG. 26, each fluid conduit opens into the bottom of the well bore through nozzle apertures 416. As noted by the drawing, nozzle apertures of different diameters may be provided for different needs.

FIG. 27 further illustrates the telemetry wires 376 in the well casing stub 404 and in the multi-conduit pump section 406. Electrical conduit connector 418, seal intermediate connector 126 and well casing stub connector 420 provide continuity of the telemetry wires 376 to the sensor chamber 422. The sensor chamber 422 within the well casing stub 404 is shown in greater detail in FIG. 28. In FIG. 26 a plurality of sensors, one of which is shown as reference character 424, are provided in the terminal end of the sensor chamber 422. The sensor chamber 422 includes a number of threaded inlets 426 into which an externally threaded sensor 424 is secured This arrangement is much like a threaded fuse in an electrical junction box, with the exception that there is provided a gasket 428 which prevents fluid from leaking into the sensor chamber 422. Spring loaded sensor contacts 430 provide continuity from the sensor element 424 to the telemetry wires 376.

This construction is highly advantageous as a number of sensor elements 424 can be preselected and secured within the well casing stub 404 to sense particular downhole parameters which are expected to be critical to production of the particular type of well. Amplifiers and other detector equipment in the monitor and control panel 394 may be wired according to the type of sensors 424 installed in the well casing stub 404 so that the particular parameters sensed can be transposed into usable indications of such parameters. In addition, should it be desired to employ more sensor elements 424 and telemetry wires 376 than can be accommodated by a single electrical conduit 374, other fluid conduits may be fitted with telemetry wires and corresponding connectors to provide an additional capacity for sensor equipment.

With regard to FIG. 27 the collar 412 secures the conduit terminal end 414 to the multi-conduit pump section 406 by the corresponding internal and external threads. The multi-conduit pump section 406 has a central bore 432 which serves as the cylinder in which the pump plunger 434 is reciprocally moved to force production fluid upwardly. The pump plunger 434 includes conventional circumferential seals 436 for preventing a fluid seal above and below the pump plunger 434. On the downstroke of the pump plunger 434 production fluid is forced upwardly through passage 440, through open check valve 438 and to the top side of the pump plunger 434. On the upstroke of the plunger 434, the check valve 438 closes and production fluid is forced upwardly to surface storage tanks (not shown).

Multi-Conduit Drill Pipe and Coupler

FIG. 29 shows a portion of a drill string including the bottom end of an upper drill pipe 596, a top end of a lower drill pipe 598, and a fully assembled coupling assembly generally identified by reference numeral 600. Of course, a typical drill string would include many more drill pipes and couplings. The coupling assembly 600 comprises a collar 638, a seal subassembly 644, and a lift subassembly 682 for coupling the multi-conduit drill pipes 596 and 598 of the invention together. To be described in more detail below, the bottom end of each drill pipe includes a hole 700 for equalizing internal and external fluid pressures between the outer casing of the drill pipe.

FIG. 30 shows the drill pipe ends and coupling 600 separated into its two main components: a first end assembly 610 and a second end assembly 612. FIG. 30 illustrates the drill pipes as they would appear fully assembled and ready for use at the drilling site. FIGS. 29 and 30 are of a reduced scale compared to FIG. 31 for convenience of illustration only.

FIG. 31 shows the details of the multi-conduit drill pipes of the invention and the coupling 600 broken down into their individual subassemblies. Each drill pipe 596 and 598 includes a tubular outer casing 614 and 616. As can be further seen by FIG. 31, the outer casing 614 of the upper drill pipe 596 has external threads 618 on its bottom end 622. The outer casing 616 of the lower drill pipe 598 has external threads 620 on its top end 624.

As can be appreciated, the two drill pipes 596 and 598 shown with the illustrated top and bottom ends 622 and 624 are identical in construction.

Enclosed by the outer casing 614 of the upper drill pipe 596 is a plurality of radial tubes 626 and a central conduit 628. The radial tubes 626 are arranged peripherally around the central conduit 628. A plurality of similar radial tubes 630 and central conduit 632 can also be seen to be enclosed by and extend from outer casing 616 of the lower drill pipe 598. The bottom ends of the radial tubes 626 and the central conduit 628 have polished unthreaded ends, whereas the top ends of the radial tubes 630 and the central conduit 632 have external threads 634 and 636, respectively. Central conduits 628 and 632 are constructed longer than radial tubes 626 and 630. Also, the radial tubes 626 and 630 are constructed longer than the outer casings 614 and 616.

A collar 638 is designed to be secured over the outer casing 614 by threading the same onto the lower end 622 thereof employing outer casing threads 618 and collar internal threads 640. The collar 638 also has reverse internal threads 642 for threadably securing the collar to the seal subassembly 644 with reverse outer threads 646 of the seal subassembly 644. Seal subassembly 644 also has external threads 648 on an opposite end from that on which threads 646 are formed. Threads 648 are right-hand and of the self-sealing type.

The seal subassembly 644 has an outer diameter and an inner diameter defining a thick side wall 650 and a central bore 654. The central bore 654 is constructed to receive therein the central conduit 628 of the upper drill pipe 596 and the central conduit 632 of the lower drill pipe 598. A plurality of radially arranged channels 656 are formed axially within the thick sidewall 650. The channels 656 are radially arranged and spaced apart for receiving therein the upper and lower radial tubes 626 and 630.

The seal subassembly 644 has internal threads 658 formed within the central bore 654, as well as internal threads 660 formed within radial channels 656. Neither the central bore 654 nor the radial channels 656 are threaded at the opposite end.

Each radial channel 656 has an enlarged diameter portion 662 constructed to allow the lower ends of the radial tubes 626 to be freely slidably received therein. The channel section 663 connects the sealed channel end with the threaded channel end to provide an individual fluid passage through the seal subassembly 644. Enlarged portion 662 is formed so as to allow the radial tubes 626 to telescopically slide axially within the seal subassembly 644 in response to any tensile forces on outer casing 614 which may tend to lengthen such outer casing. The central bore 654 of the seal subassembly has an enlarged diameter portion 664, similar to the enlarged diameter portions 662 of the radial channels 656, for slidably receiving therein the central conduit 628 to allow for axial movement thereof in response to the noted tensile forces on outer casing 614.

Each end of the radial channels 656 are provided with internal annular grooves 666 and 668 for receiving therein T-ring type seals (not shown). The central bore 654 is similarly provided with internal annular groove 670 and 672 for also receiving T-ring seals, one of which is shown as seal 674 in groove 670. All T-ring seals are provided with back-up rings, for example, as shown by ring 676 on T-ring 674, to prevent movement of the T-ring seals during any telescopic axial movement of the central conduit 628 or radial tubes 626 with respect to the seal subassembly 644. The radial channels 656 and the central bore 654 are provided with sealing surfaces 678 and 680, respectively, so that when tensile forces are applied to the outer casings 614 and 616, the radial tubes 626 and the central conduit 628 will maintain in sealing contact with their respective T-ring seals. The sealing surfaces 678 and 680 are constructed with a reduced diameter, with respect to the enlarged sections 662 and 664, for engaging the respective radial tubulars 626 or central conduit 628 in response to radial expansion thereof because of high pressure fluids carried therein The sealing surfaces 678 and 680 function to contain the T-ring seals and prevent flowing thereof when the radial tubulars 626 or the central conduit 628 expands radially and telescopically moves with respect to the T-ring seals.

Importantly, that part of the outer surfaces of the radial tubes 626 and the central conduit 628 which engages with the T-ring seals are polished or otherwise made smooth so as to provide a high quality seal with the T-rings. In like manner, the sealing surfaces 678 and 680 are precision machined or otherwise made smooth to prevent galling thereof, or galling of the radial tubes 626 or central conduit 628, as the parts move axially with respect to each other. This is essential when the radial tubes 626 and central conduit 628 carry high pressure fluids an telescopically slide within the T-ring seals as the drill string extends many feet into the earth and becomes elongated due to its own weight. Portions of the threaded ends of the radial tubes 630 and the central conduit 632 are comparably polished to provide a sealing surface with the T-rings located within the annular grooves formed at the bottom of the seal subassembly 644. All T-ring seals and back-up rings are of a type well known in the art, as for example those manufactured by Parker Seal Group of Lexington, Ky.

The lift subassembly 682 is constructed for threadable attachment of the seal subassembly 644 to top end of the outer casing 616 of the lower drill pipe 598. The lift subassembly 682 has an annular recess 684 formed around its outer surface to facilitate attachment of the top drill pipe 596 to the bottom drill pipe 598 (FIG. 30). Plural annular recesses can be employed to assist in the automatic indexing and positioning of the drill string when adding drill pipes thereto. The lift subassembly 682 has internal threads 686 for attachment to the seal subassembly 644 and other internal threads 688 for attachment to the top part of the outer casing 616 of the lower drill pipe 598. Internal threads 686 and 688 are of the self-sealing type.

In accordance with an important feature of the invention, the recessed area 684 and the lower end edge 689 of the lift subassembly 682 provide particular areas of the lower drill pipe 598 which can be engaged by automated suspension hoisting equipment to repeatedly position the drill string at a predetermined vertical position In this manner, when it is necessary to attach an additional section of drill pipe to the drill string, automated equipment can be utilized to position the drill string, align the added drill pipe thereover, and fasten the two together. Drill string handling equipment, such as a spider, can be used to grasp the drill pipe casing 616 and prevent slipping thereof due to engagement with the lift subassembly end edge 689. When multiple annular recesses 684 are employed, one such recess can be used for gripping by the spider equipment. This feature permits automated drilling operations so that risk of harm to personnel is reduced, as well as provide an increased pipe handling efficiency.

In accordance with another feature of the invention, one or more of the radial tubes 626 may be designated for receiving electrical wiring. As can best be seen in FIG. 30, radial tube 690 is of a smaller diameter than the other radial tubes 626. Radial tube 690 may be used for housing electrical wires or cables, and by its smaller diameter may also serve as a means for indexing the connection of one drill pipe to another. Electrical connectors (not shown) of the plug and socket type may be used to facilitate the electrical connections for joining the wires between joined drill pipes.

The outer casing 614 is pierced to form a fluid port 700, shown in FIG. 29. This allows equalization of internal and external fluid pressure of the casing 614. Each drill pipe outer casing is comparably constructed for such pressure equalization. With pressure equalization, the outer casings 614 and 616, collar 638, seal subassembly 644 and lift subassembly 682 can be constructed of a high strength steel and subjected only to tensile and torque forces. By utilizing the equalization ports, the outer casings 614 and 616 do not need to also withstand compression and burst forces Steel having a tensile strength in the range of 100,000 pounds is suitable for use in constructing the drill pipes of the invention. On the other hand, the radial tubes 626 and 630 and the central conduits 628 and 632 need be constructed so as to withstand only compression and burst pressure forces. Because the radial tubes 626 and the central conduit 628 are constructed for telescopic movement within the respective T-ring seals, they thus sustain no torsional or tension forces. Accordingly, the drill pipe of the invention is constructed with separate elements so that one element sustains torsion and tension loads, while the other element sustains compression and burst loads. Each such element can thus be constructed with reduced strength, as each such element does not have to withstand all four forces. The hole 700 located at the bottom of each drill pipe facilitates the use of blowout preventers for capping the drill pipe as well as the well annulus.

In assembling the drill pipes of the invention, the central conduit 632 is first secured to the internal threaded part 658 of the seal subassembly 644. Next, the radial tubulars 630 are threaded into the corresponding threaded holes 656 formed within the seal subassembly thick sidewall 650. When indexing is desired, or when using different sized radial tubulars, the proper sized tubulars are used to provide a desired angular indexing of the drill pipe. Once all tubulars are secured to the seal subassembly 644, the lift subassembly is threadably secured to the seal subassembly 644. The outer casing 616 of the lower drill pipe 598 is then slid over the radial tubulars 630 and threadably secured to the lift subassembly 682. This procedure completes the assembly of the top part of the lower drill pipe 598 as noted in FIG. 30.

When coupling drill pipes together, the central conduit 628 of the upper drill pipe 596 is inserted into central bore 654 of the seal subassembly 644, and the radial tubes 626 are rotated to properly index with the matching radial tubulars 630 of the lower drill pipe 598. The collar 638 is then threadably attached to the seal subassembly 644. Due to the reverse design of threads 642 and 646, the turning of collar 638 forces outer casing 614 toward the seal subassembly 644, thus fully inserting the radial tubes 626 and the central conduit 628 into the corresponding channels and bore of the seal subassembly 644. As shown in FIG. 29 the drill pipes are now fully assembled.

In summary, the foregoing illustrates the advantages presented by a multi-conduit tubular employed as a drill pipe or as a well casing. Because of the plurality of conduits provided a variety of access channels are available at the bottom of the bore hole, whereby a multiplicity of downhole parameters may be sensed, tools operated and, through the various fluid conduits, the overall drilling and production of the well can be managed to a higher degree of efficiency.

While the preferred embodiments of the methods and apparatus have been disclosed with reference to specific constructions of the tubulars, conduits, coupling and the like, it is to be understood that many changes in detail may be made as a matter of engineering choices without departing from the scope of the invention as defined by the appended claims. Indeed, those skilled in the art may prefer, for example, to embody the cross-over sub features directly into a drill pipe, seal assembly or drill bit, and in light of the invention they will find it easy to implement that choice. Also, it is not necessary to adopt all of the various advantageous features of the present disclosure into a single composite tubular in order to realize their individual advantages. Moreover, the scope of the invention is not to be limited to the details disclosed herein, but is to be accorded the full scope of the claims so as to embrace any and all equivalent apparatus and methods.

What is claimed is:

1. A drill pipe for use in drilling subterranean formations, comprising:
    an outer casing threadable at both ends thereof for connection to other similar casings, said outer casing being adapted to withstand torque and tensile loads of other pipes connected thereto;
    at least one tubular conduit floating within said outer casing so as to be substantially relieved of tensile loads carried by said outer casing, said conduit adapted for carrying pressurized fluids therethrough;
    a coupler for coupling said outer casing to the other similar outer casing of other drill pipes, said coupling having means for transferring torque and tensile loads from one said outer casing to another, and means for supporting the end of said conduit within said outer casing so as to prevent transfer of tensile loads through said conduit; and
    means for sealing said conduit to other similar conduits in said other similar outer casing for providing a continuous sealed conduit for carrying pressurized fluids.

2. The drill pipe of claim 1, wherein said outer casing is pierced so as to equalize internal and external pressures.

3. The drill pipe of claim 1, wherein said means for transferring loads between said outer casings comprises:
    a collar having a first and second threaded end, one said end being threadably secured to said outer casing;
    a seal subassembly having a first and second threaded end, one said end being threadably secured to said collar; and
    a lift subassembly having a first and second threaded end threadably secured to said seal subassembly and threadably secured to said other similar outer casing.

4. The drill pipe of claim 1, wherein said means for sealing said conduit to a similar conduit in another outer casing comprises:
    a seal subassembly having at least one bore for sealing one end of said conduit, and for sealing another end of said similar conduit; and
    said bore has annular grooves, each for receiving an elastomeric seal.

5. The drill pipe of claim 4, wherein said elastomeric seal is a T-ring type seal.

6. The drill pipe of claim 5, wherein said T-ring seal includes anti-extrusion rings.

7. The drill pipe of claim 3, wherein said lift subassembly further includes an external annular recess for facilitating drill pipe handling, and an end edge for positioning said drill pipe.

8. An improved drill pipe utilizing multi-conduit tubulars, comprising:
    an outer casing having first and second ends;
    a central conduit housed within said outer casing and having a length somewhat longer than said outer casing so as to protrude from said first and second ends of said outer casing;
    a plurality of radially arranged radial tubes disposed within said outer casing and having a length somewhat longer than said outer casing but shorter than said central conduit, and disposed between said outer casing and said central conduit;
    a seal subassembly having first and second ends constructed and arranged so as to sealingly receive and support said central conduit and said radial tubes;
    a collar for connecting said outer casing to said seal subassembly; and
    a lift subassembly for connecting said seal subassembly to another similar outer casing, whereby said radial tubes and said conduits are sealed by said seal subassembly which is in turn connected to said outer casings by said collar on one end thereof and to said lift subassembly on the other end thereof.

9. The improved drill pipe of claim 8, wherein said outer casing is pierced therethrough so as to equalize internal and external fluid pressures.

10. The improved drill pipe of claim 8, wherein said seal subassembly further comprises:
    a cylinder having an external diameter and an internal diameter defining a thick sidewall;
    an axial central bore formed by said internal diameter for receiving said central conduit; and
    a plurality of radial channels formed in said thick sidewall for receiving said radially arranged radial tubes.

11. The improved drill pipe of claim 10, wherein said central bore and said radial channels have sealing means for interconnecting one end of said central conduit and of said radial tubes to another end of another central conduit and other radial tubes.

12. The improved drill pipe of claim 11, wherein said sealing means comprises elastomeric seals inserted in annular grooves formed in said seal subassembly.

13. The improved drill pipe of claim 12, wherein said central bore further includes a reduced diameter section in which one said annular groove is formed, said reduced diameter section being effective to prevent flowing of said elastomeric seal.

14. The improved drill pipe of claim 13, wherein said reduced diameter section has a polished surface for engagement with said central conduit.

15. The improved drill pipe of claim 12, wherein each said radial channel includes a reduced diameter section in which an annular groove is formed, said reduced diameter section being effective to prevent said elastomeric seals from flowing.

16. The improved drill pipe of claim 15, wherein each said reduced diameter section, has a polished surface engageable with a respective one of said radial tubes.

17. The improved drill pipe of claim 12, wherein said elastomeric seals comprise T-ring seals.

18. The improved drill pipe of claim 17, wherein said T-ring seals include anti-extrusion rings.

19. The improved drill pipe of claim 8, wherein said lift subassembly further includes an outer annular recess for facilitating drill pipe handling, and an end edge for positioning said drill pipe.

20. An improved apparatus for coupling drill pipes utilizing independent tubular conduits, comprising:
    a seal subassembly for sealingly receiving and supporting one set of independent tubular conduits in a floating manner in one end of said seal subassembly, and for sealingly receiving and supporting a second set of independent tubular conduits in a fixed manner in another end thereof;
    a collar for connecting the one end of said seal subassembly to a first drill pipe; and
    a lift subassembly for connecting to another end of said seal subassembly and to a second drill pipe.

21. A method for coupling drill pipes utilizing independent tubular conduits, comprising the steps of:
    inserting an end of a first said tubular conduit into a seal subassembly so as to sealingly support said conduit;
    connecting a lift subassembly to said seal subassembly;
    connecting a first drill pipe to said lift subassembly;
    inserting an end of a second tubular conduit into said seal subassembly so as to slideably and sealingly engage said second tubular conduit to said seal subassembly and to connect said first tubular conduit to said second tubular conduit;
    connecting a collar to a second said drill pipe; and
    connecting said collar to said seal subassembly.

22. An improved drill pipe string utilizing multi-conduit tubulars, comprising:
    a pair of tubular outer casings each having first and second ends;
    a tubular central conduit protruding from said first and said second ends of each of said outer casings;
    each of said tubular central conduits having first and second threaded ends;
    a plurality of radial tubes each having a first end and a second threaded end extending from said first and second end of each of said outer casing;
    said plurality of radial tubes being disposed respectively between each of said outer casings and each of said central conduits;
    said radial tubes having a length somewhat longer than each of said respective outer casing but shorter than each of said respective central conduits;
    a seal subassembly having first and second ends being disposed between said first and second end of said outer casing;
    said seal subassembly having a central bore for receiving said central conduits;
    said seal subassembly having a plurality of hollow tubular channels between said central bore and an external surface of said seal subassembly;
    said seal subassembly having means for receiving said central conduits and said plurality of radial tubes;
    said means for receiving said central conduits and said plurality of radial tubes comprising:
        said first end of said seal subassembly having slideable means for receiving said first ends of said central conduits and said first ends of said plurality of radial tubes; and
        said second end of said seal subassembly having thread means for receiving said second threaded ends of said central conduits and said second threaded ends of said plurality of radial tubes;
    a collar for connecting said first end of said outer casing to said first end of said seal subassembly;
    a lift subassembly for attaching said second end of said seal subassembly to said second end of said outer casing;
    said lift subassembly having an external annular recess;
    each of said outer casings being pierced to equalize the pressure internal and external to said casings;
    said plurality of tubular channels and said tubular central bore of said seal subassembly having annular grooves in said first and second ends for receiving a T-ring seal;
    said T-ring seal being secured by anti-extrusion rings; and
    said plurality of tubular channels and said central tubular bore of said seal subassembly having annular ridges located between said annular grooves and said second end adjacent to said annular grooves, whereby the second end of the central conduit is threadably attached to the second end of the seal subassembly, the second end of the plurality of radial tubes is threadably attached to the second end of the seal subassembly, the first end of the lift subassembly is attached to the second end of the seal subassembly, a first outer casing is slipped over the central conduit and the radial tubes so that the second end of the casing is attached to the second end of the lift subassembly, the first end of the collar is attached to the first end of a second outer casing so that the first end of the radial tubes and the first end of the central conduit protrude beyond the second end of the collar, the first end of the central conduit is then inserted into the first end of the seal subassembly, the first end of the second outer casing is rotated so that the first end of the radial tubes is properly aligned with the first end of the seal subassembly and the collar is then turned so as to force the first end of the second outer casing toward the first end of the seal subassembly, thus inserting the first end of the radial tubes and the central conduit into their respective channels and bores in the seal subassembly.

23. The drill pipe of claim 1, further including a plurality of said tubular conduits radially arranged within said outer casing.

* * * * *